(12) United States Patent
Linsky et al.

(10) Patent No.: US 11,343,312 B2
(45) Date of Patent: May 24, 2022

(54) SOCIAL MESH NETWORKS

(71) Applicant: QUALCOMM Incorporated, San Diego, CA (US)

(72) Inventors: Joel Linsky, San Diego, CA (US); Robin Heydon, Cambridge (GB)

(73) Assignee: QUALCOMM INCORPORATED, San Diego, CA (US)

(*) Notice: Subject to any disclaimer, the term of this patent is extended or adjusted under 35 U.S.C. 154(b) by 0 days.

(21) Appl. No.: 15/712,061

(22) Filed: Sep. 21, 2017

(65) Prior Publication Data

US 2019/0089777 A1 Mar. 21, 2019

(51) Int. Cl.
| | | |
|---|---|---|
| *H04W 4/00* | (2018.01) | |
| *H04L 67/1042* | (2022.01) | |
| *H04L 41/12* | (2022.01) | |
| *H04W 84/12* | (2009.01) | |
| *H04W 84/18* | (2009.01) | |
| *H04L 29/06* | (2006.01) | |
| *H04W 12/06* | (2021.01) | |
| *H04W 80/04* | (2009.01) | |

(52) U.S. Cl.
CPC ........ *H04L 67/1059* (2013.01); *H04L 41/12* (2013.01); *H04L 63/0815* (2013.01); *H04W 12/06* (2013.01); *H04W 84/12* (2013.01); *H04W 84/18* (2013.01); *H04W 80/04* (2013.01)

(58) Field of Classification Search
CPC ......... H04W 4/00; H04W 4/80; H04W 84/18
See application file for complete search history.

(56) References Cited

U.S. PATENT DOCUMENTS

| | | | |
|---|---|---|---|
| 7,110,372 B2 | 9/2006 | Kovacs et al. | |
| 8,837,528 B2 | 9/2014 | Harris et al. | |
| 9,300,581 B1 | 3/2016 | Hui et al. | |
| 9,462,464 B2 | 10/2016 | Patil et al. | |
| 9,544,754 B1 | 1/2017 | Lambert | |
| 9,654,564 B2 | 5/2017 | Malik et al. | |
| 2007/0198831 A1* | 8/2007 | Suzuki | H04L 9/3263 |
| | | | 713/156 |
| 2008/0304485 A1 | 12/2008 | Sinha et al. | |
| 2010/0077017 A1 | 3/2010 | Martinez et al. | |

(Continued)

FOREIGN PATENT DOCUMENTS

| | | |
|---|---|---|
| CN | 1823504 A | 8/2006 |
| CN | 104683431 A | 6/2015 |

(Continued)

OTHER PUBLICATIONS

International Search Report and Written Opinion—PCT/US2018/048474—ISA/EPO—dated Feb. 12, 2019.

(Continued)

*Primary Examiner* — Khalid W Shaheed
(74) *Attorney, Agent, or Firm* — Procopio, Cory, Hargreaves & Savitch

(57) ABSTRACT

In an aspect of the disclosure, a method, a computer-readable medium, and an apparatus are provided. In certain configurations, the apparatus may connect to a mesh network that includes at least the first device and a second device. The apparatus may communicate with the second device without obtaining one or more access credentials from the second device.

28 Claims, 17 Drawing Sheets

(56) References Cited

U.S. PATENT DOCUMENTS

| | | | |
|---|---|---|---|
| 2013/0250904 A1* | 9/2013 | Kang | H04B 7/0452 |
| | | | 370/329 |
| 2016/0014669 A1* | 1/2016 | Patil | H04W 40/246 |
| | | | 370/329 |
| 2016/0162252 A1 | 6/2016 | Di Censo et al. | |
| 2016/0337346 A1* | 11/2016 | Momchilov | G06F 21/34 |
| 2017/0171071 A1 | 6/2017 | Turon | |
| 2017/0318421 A1* | 11/2017 | Kim | H04W 4/50 |
| 2018/0091506 A1* | 3/2018 | Chow | H04L 67/2838 |

FOREIGN PATENT DOCUMENTS

| | | | |
|---|---|---|---|
| EP | 3032537 A2 | 6/2016 | |
| WO | 2016183261 A1 | 11/2016 | |

OTHER PUBLICATIONS

Partial International Search Report—PCT/US2018/048474—ISA/EPO—dated Nov. 21, 2018.

Taiwan Search Report—TW107130524—TIPO—dated Sep. 24, 2021.

\* cited by examiner

SOCIAL MESH NETWORKS

BACKGROUND

Field

The present disclosure relates generally to communication systems, and more particularly, to creating social mesh networks.

Background

A wireless mesh network (WMN) is a distributed network of mesh nodes (e.g., wireless routers, cellular base stations, access points, etc.) that are organized in a mesh topology, and configured to relay communications from point A to point B within the WMN. Using the distributed network of mesh nodes, signals may be carried from point A to point B by splitting the distance (e.g., from point A to point B) into a series of hops between intermediate mesh nodes. Intermediate mesh nodes cooperatively pass the signal from point A to point B by making forwarding decisions based on knowledge of the spatial relationship of the mesh nodes within the WMN (e.g., the mesh topology).

As compared to other types of communication networks, WMNs may offer certain advantages such as increased reliability. For example, when a mesh node in the WMN malfunctions, the remaining mesh nodes may still route signals from point A to point B using an updated mesh topology that no longer includes the malfunctioning mesh node. In other words, WMN may be able to "self-form" and "self-heal" when a mesh node in the WMN malfunctions. While WMNs offer certain advantages, there exists a need for further improvements in WMN technology.

For example, WMNs may be constrained by location and/or use case. In order to communicate with a second user via a WMN, both the first user and the second user will have to be within a short-range communication distance of a wireless mesh node in order to access the WMN.

Furthermore, in order for the first user to communicate with the second user via the WMN, the second user will have to be associated with the WMN. For example, assume a use case in which the first user and the second user are friends, the first user and the second user do not work together, the second user comes to the first user's workplace for lunch, and that the first user's workplace has a workplace WMN. In such a use case, the first user will unlikely be able to communicate with the second user (e.g., share video files, image files, audio files, etc.) via the workplace WMN since the second user is not part of the workplace WMN.

Thus, there exists a need to create a social mesh network that does not suffer the location and/or use case constraints associated with traditional WMNs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As compared to other types of communication networks, WMNs may offer certain advantages such as increased reliability. For example, when a mesh node in the WMN malfunctions, the remaining mesh nodes may still route signals from point A to point B using an updated mesh topology that no longer includes the malfunctioning mesh node. In other words, WMN may be able to "self-form" and "self-heal" when a mesh node in the WMN malfunctions. While WMNs offer certain advantages, there exists a need for further improvements in WMN technology.

For example, WMNs may be constrained by location and/or use case. In order to communicate with a second user via a WMN, both the first user and the second user will have to be within a short-range communication distance of a wireless mesh node in order to access the WMN.

Furthermore, in order for the first user to communicate with the second user via the WMN, the second user will have to be associated with the WMN. For example, assume a use case in which the first user and the second user are friends, the first user and the second user do not work together, the second user comes to the first user's workplace for lunch, and that the first user's workplace has a workplace WMN. In such a use case, the first user will unlikely be able to communicate with the second user (e.g., share video files, image files, audio files, etc.) via the workplace WMN since the second user is not part of the workplace WMN.

Traditional social networking enables users to communicate (e.g., share video files, image files, audio files, etc.) via social media accounts (e.g., Facebook®, Twitter®, Instagram®, etc.). However, accessing a social media account on a user device requires internet access. In certain instances, users may want to be part of a particular social network (e.g., football team members social mesh network, volunteer group social mesh network, friends social mesh network, partner social mesh network, family social mesh network, etc.) that enables communication between user devices that are part of the social network, but does not require internet access for communication and/or signing up for a social media account.

Thus, there exists a need to create a social mesh network that does not suffer the location and/or use case constraints associated with traditional WMNs, and/or does not require an internet connection or a social media account.

The present disclosure provides a solution to the constraints associated with WMNs and traditional social networking by enabling a user's device (e.g., smartphone, smart vehicle, wireless speaker system, etc.) to obtain access credentials for all of the devices that make up a social mesh network when the user initially joins the social mesh network.

As an illustrative example, assume Bob's smartphone and Steve's wireless speaker system are both part of a "Football Social Mesh Network," and that Bob is at Steve's house. In such a use case, Bob may be able to access a song from his smartphone and click "Play on Football Social Mesh Speaker" (e.g., Steve's wireless speaker system) in order to play the song without first acquiring the access credentials (e.g., perform Bluetooth® (BT) pairing) for Steve's wireless speaker system.

By providing the user's device with the access credentials for all of the devices that make up a social mesh network, a user may be able to communicate with other users (e.g., using short-range communications) in the social mesh network without accessing a traditional WMN, accessing the internet, or signing up for a social media account.

In an aspect of the disclosure, a method, a computer-readable medium, and an apparatus are provided. In certain configurations, the apparatus may connect to a mesh network that includes at least the first device and a second device. The apparatus may communicate with the second device without obtaining one or more access credentials from the second device.

In certain other configurations, the apparatus may determine a mesh network that includes at least a first device and a second device. The apparatus may receive, from the first device, a packet intended for the second device. The apparatus may determine if the second device is connected to the mesh network. The apparatus may maintain the packet when it is determined that the second device is not connected to the mesh network. The apparatus may communicate the packet to the second device when it is determined the second device is connected to the mesh network.

In certain other configurations, the apparatus may connect with a mesh network that includes a second device. The apparatus may determine one or more properties associated with the mesh network. The apparatus may receive published information from the mesh network, the published information originating from the second device. The apparatus may perform an action based on the information associated with the one or more properties.

In certain other configurations, the apparatus may determine a mesh network that includes at least a first device and a second device. The apparatus may determine one or more properties associated with the mesh network. The apparatus may receive information published by the first device to the mesh network. The apparatus may determine if the second device is connected to the mesh network. The apparatus may maintain the information published by the first device when it is determined that the second device is not connected to the mesh network. The apparatus may transmit the information to the second device when the second device is connected to the mesh network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
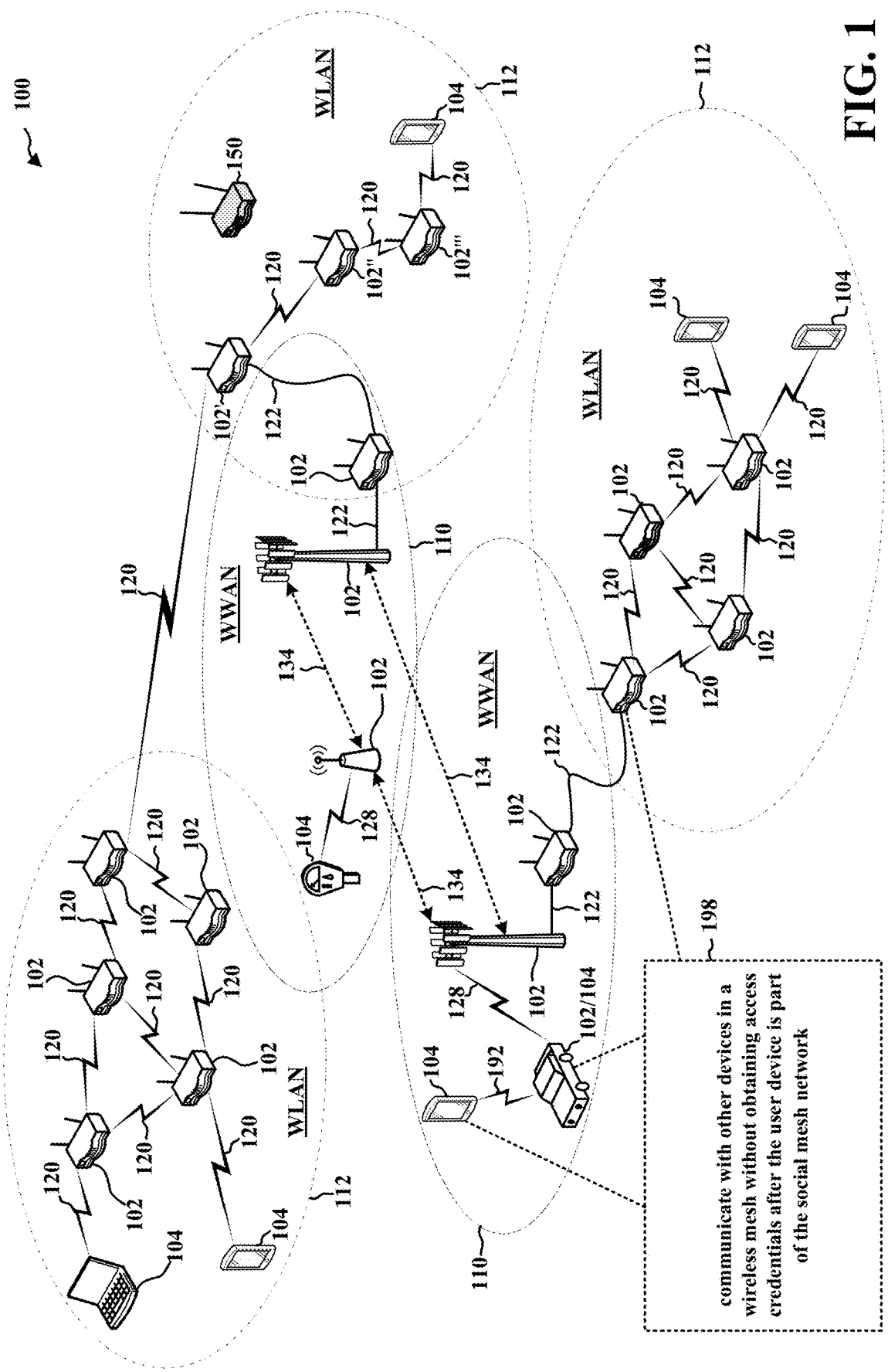
FIG. 1 is a diagram illustrating an example of a WMN.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates an example WMN 100 in accordance with certain aspects of the disclosure. The WMN 100 may comprise one or more wireless wide area networks (WWANs) 110 and/or one or more wireless local area networks (WLANs) 112 that communicate with one another. Each WWAN 110 and WLAN 112 in the WMN 100 may include mesh nodes 102 that receive, transmit, relay, repeat, boost, etc., signals other mesh node(s) 102, and/or to mesh client devices 104. Each mesh node 102 may comprise a transmitter chain and a receiver chain, each of which may in turn comprise a plurality of components associated with signal transmission and reception (e.g., processors, modulators, multiplexers, demodulators, demultiplexers, antennas, etc.), as will be appreciated by one skilled in the art.

Examples of a mesh nodes 102 include a base station, a g Node B (gNB) (e.g., a base station configured to operate in millimeter wave (mmW) frequencies and/or near mmW frequencies), a Node B, an evolved Node B (eNB), a Wi-Fi access point (AP), a base transceiver station, a radio base station, a radio transceiver, a transceiver function, a basic service set (BSS), an extended service set (ESS), a satellite, a satellite radio, a vehicle, a smart device, or some other similarly functioning devices. Certain mesh nodes 102 function as an access point to the WMN 100 for mesh client devices 104. Mesh nodes 102 may communicate with one another via a wireless communication link 120, a wired communication link 122, and/or through an evolved packet core (EPC) using a backhaul link 134.

Mesh client devices 104 may be either fixed or mobile, and dispersed throughout the WMN 100. Examples of mesh client devices 104 include a cellular phone, a smart phone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similarly functioning device. Some of the mesh client devices 104 may be referred to as Internet of Things (IoT) devices (e.g., parking meter, gas pump, toaster, vehicles, etc.). A mesh client device 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. Certain devices 102/104 in the WMN 100 may act as both a mesh node 102 (e.g., relaying signals from another mesh client device 104 to another mesh node 102) and a mesh client device 104.

Each mesh client device 104 may communicate with zero, one, or multiple mesh nodes 102 at any given moment. Each mesh node 102 may communicate with zero, one, or multiple mesh client devices 104 at any given moment. Each mesh node 102 may communicate with zero, one, or multiple other mesh nodes 102 at any given moment.

When a cellular base station (e.g., gNB, eNB, etc.) is used as a mesh node 102, the communication link(s) 128 between the mesh node 102 and the mesh client device 104 may include uplink (UL) (also referred to as reverse link) transmissions from a mesh client device 104 to a mesh node 102 and/or downlink (DL) (also referred to as forward link) transmissions from a mesh node 102 to a mesh client device 104. The communication link 128 may use multiple-input and multiple-output (MIMO) antenna technology, including spatial multiplexing, beamforming, and/or transmit diversity. The communication link 128 may be through one or more carriers. The mesh node 102/mesh client device(s) 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

When a Wi-Fi router and/or a Wi-Fi AP is used as a mesh node 102, communications between different mesh nodes 102 or between a mesh node 102 and a mesh client device 104 may occur via communication links 120 in a 5 GHz unlicensed spectrum. When communicating in an unlicensed frequency spectrum, the mesh nodes 102/mesh client devices 104 may perform a clear channel assessment (CCA) prior to communicating in order to determine whether the channel is available.

Mesh client devices 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

According to certain aspects, the WMN 100 may support multi-hop communications in which a first mesh node 102' utilizes a second mesh node 102" as a relay to a third mesh node 102''' (e.g., or a mesh client device 104). For instance, first mesh node 102' may lack sufficient signal strength to transmit to third mesh node 102''', but have sufficient signal strength to transmit to the second mesh node 102". In addition, first mesh node 102' may determine that second mesh node 102" has sufficient signal strength to transmit to third mesh node 102'''. Here, first mesh node 102' may route a DL communication through second mesh node 102" to third mesh node 102'''. Hence, the second mesh node 102" acts as a relay for the first mesh node 102'.

According to certain other aspects, the WMN 100 may be able to "self-form" and/or "self-heal" when a mesh node 150 within the WMN 100 malfunctions or is no longer a part of the mesh topology. For example, if the third mesh node 102''' typically routes UL communications from a mesh client device 104 to the first mesh node 102' via mesh node 150, the third mesh node 102''' may route UL communications to the first mesh node 102' via the second mesh node 102" when mesh node 150 malfunctions. In other words, an updated topology that no longer includes mesh node 150 may be determined by the WMN 100 in order to continue relaying communications between the third mesh node 102''' and the first mesh node'.

Referring again to FIG. 1, in certain aspects, the mesh client device 104 may be configured to communicate with other mesh client devices in a wireless mesh network without obtaining access credentials after the mesh client device is part of the social mesh network (198), e.g., as described in connection with any of FIGS. 2-17.

Figure 2:
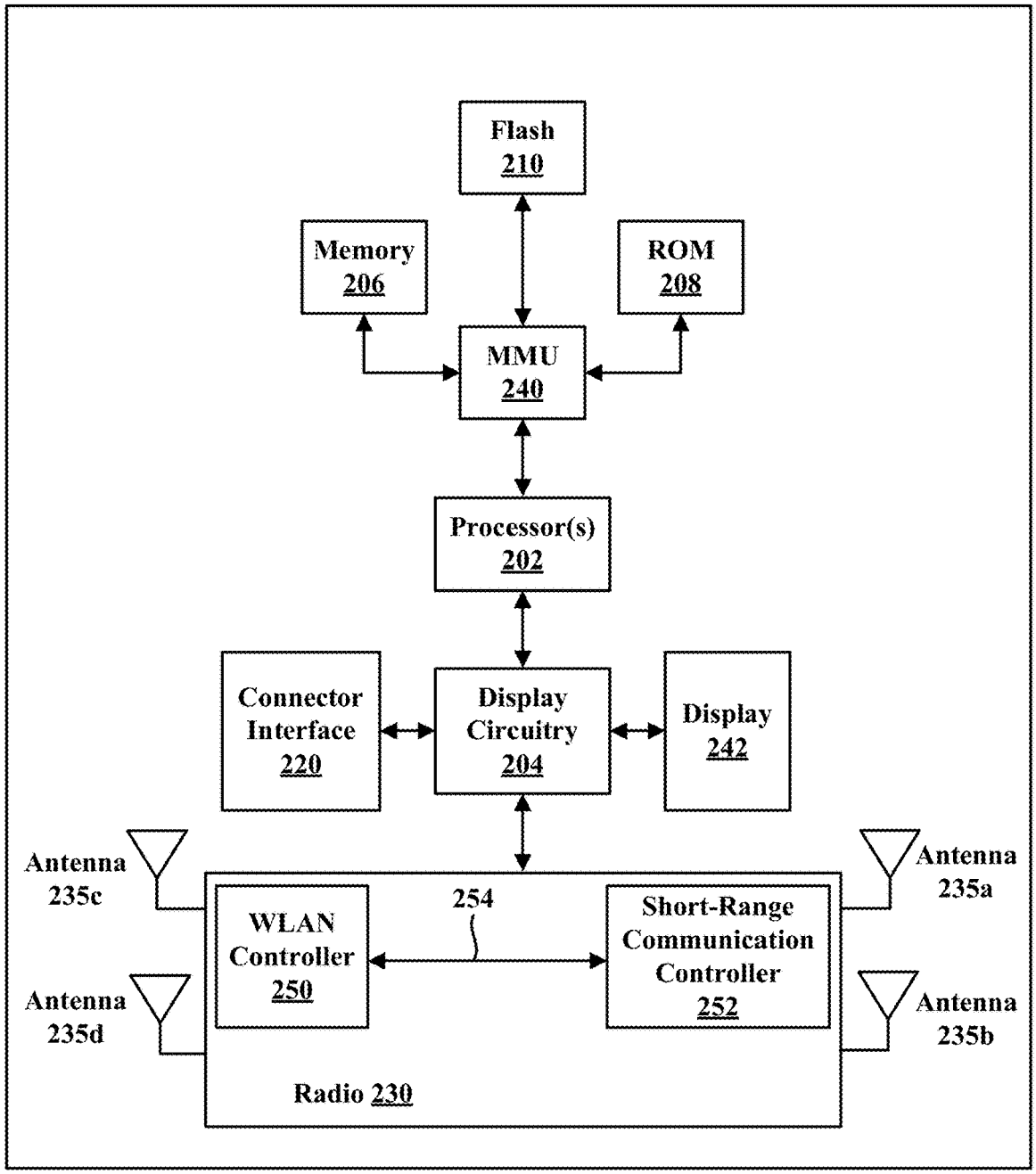
FIG. 2 is block diagram of a wireless mesh client device in accordance with certain aspects of the disclosure.

FIG. 2 is block diagram of a wireless device 200 in accordance with certain aspects of the disclosure. The wireless device 200 may correspond to, e.g., one of the wireless mesh nodes 102, and/or one of the wireless mesh client devices 104 in FIG. 1. In certain configurations, the wireless device 200 may be, e.g., part of one or more social mesh network(s).

As shown in FIG. 2, the wireless device 200 may include a processing element, such as processor(s) 202, which may execute program instructions for the wireless device 200. The wireless device 200 may also include display circuitry 204 which may perform graphics processing and provide display signals to the display 242. The processor(s) 202 may also be coupled to memory management unit (MMU) 240, which may be configured to receive addresses from the processor(s) 202 and translate the addresses to address locations in memory (e.g., memory 206, ROM 208, Flash memory 210) and/or to address locations in other circuits or devices, such as the display circuitry 204, radio 230, connector interface 220, and/or display 242. The MMU 240 may be configured to perform memory protection and page table translation or set up. In some embodiments, the MMU 240 may be included as a portion of the processor(s) 202.

As shown, the processor(s) 202 may be coupled to various other circuits of the wireless device 200. For example, the wireless device 200 may include various types of memory, a connector interface 220 (e.g., for coupling to the computer system), the display 242, and wireless communication circuitry (e.g., for Wi-Fi, BT, BT low-energy (BLE), etc.). The wireless device 200 may include a plurality of antennas 235a, 235b, 235c, 235d, for performing wireless communication with, e.g., wireless devices in a social mesh network.

In certain aspects, the wireless device 200 may include hardware and software components (a processing element) configured to communicate with other wireless devices in a wireless mesh network without obtaining access credentials after the wireless device 200 is part of the social mesh network, e.g., using the techniques described below with reference to FIGS. 3-17. The wireless device 200 may also comprise wireless mesh firmware or other hardware/software for controlling wireless mesh operations. In addition, the wireless device 200 may store and execute a WLAN software driver for controlling WLAN operations, and/or a short-range communication software driver for controlling short-range communication operations.

The wireless device 200 may be configured to implement part or all of the techniques described below with reference to FIGS. 3-17, e.g., by executing program instructions stored on a memory medium (e.g., a non-transitory computer-readable memory medium) and/or through hardware or firmware operation. In other embodiments, the techniques described below with reference to FIGS. 3-17 may be at least partially implemented by a programmable hardware element, such as an field programmable gate array (FPGA), and/or an application specific integrated circuit (ASIC).

In certain aspects, radio 230 may include separate controllers configured to control communications for various respective radio access technology (RAT) protocols. For example, as shown in FIG. 2, radio 230 may include a WLAN controller 250 configured to control WLAN communications and a short-range communications controller 252 configured to control short-range communications. A coexistence interface 254 (e.g., a wired interface) may be used for sending information between the WLAN controller 250 and the short-range communications controller 252.

In some aspects, one or more of the WLAN controller 250 and/or the short-range communications controller 252 may be implemented as hardware, software, firmware or some combination thereof.

In certain aspects, the WLAN controller 250 may be configured to communicate with a second device in a social mesh network using a WLAN link using all of the antennas 235a, 235b, 235c, 235d. In certain configurations, the short-range communications controller 252 may be configured to communicate with at least one second device in a social mesh network using one or more of the antennas 235a, 235b, 235c, 235d. The WLAN controller 250 and/or short-range communications controller 252 may be configured to communicate with other wireless devices in a wireless mesh network without obtaining access credentials after the wireless device 200 is part of the social mesh network.

For example, the WLAN controller 250 and/or short-range communications controller 252 may maintain or access a look-up table for each social mesh network associated with the wireless device 200. Each look-up table may include a list of all of the other devices in a particular social mesh network, and the associated access credentials for each device. When a beacon associated with a particular social mesh network is received by the wireless device 200, the WLAN controller 250 and/or the short-range communications controller 252 may determine which social mesh network the beacon is associated with, access the look-up table associated with that particular social mesh network, determine the access credentials for the device that transmitted the beacon, and connect the device that transmitted the beach using the access credentials maintained in the look-up table.

Using the technique described above, the wireless device 200 may be able to communicate with other wireless devices in a wireless mesh network without obtaining access credentials each time the wireless device 200 connects with another device in the social mesh network.

As compared to other types of communication networks, WMNs may offer certain advantages such as increased reliability. For example, when a mesh node in the WMN malfunctions, the remaining mesh nodes may still route signals from point A to point B using an updated mesh topology that no longer includes the malfunctioning mesh node. In other words, WMN may be able to "self-form" and "self-heal" when a mesh node in the WMN malfunctions.

While WMNs offer certain advantages, there exists a need for further improvements in WMN technology.

For example, WMNs may be constrained by location and/or use case. In order to communicate with a second user via a WMN, both the first user and the second user will have to be within a short-range communication distance of a wireless mesh node in order to access the WMN.

Furthermore, in order for the first user to communicate with the second user via the WMN, the second user will have to be associated with the WMN. For example, assume a use case in which the first user and the second user are friends, the first user and the second user do not work together, the second user comes to the first user's workplace for lunch, and that the first user's workplace has a workplace WMN. In such a use case, the first user will most likely not be able to communicate with the second user (e.g., share video files, image files, audio files, etc.) via the workplace WMN since the second user is not part of the workplace WMN.

Traditional social networking enables users to communicate (e.g., share video files, image files, audio files, etc.) via social media accounts (e.g., Facebook®, Twitter®, Instagram®, etc.). However, accessing a social media account on a user device requires internet access. In certain instances, users may want to be part of a particular social network (e.g., football team members social mesh network, volunteer group social mesh network, friends social mesh network, partner social mesh network, family social mesh network, etc.) that enables communication between user devices that are part of the social network, but does not require internet access for communication and/or signing up for a social media account.

Thus, there exists a need to create a social mesh network that does not suffer the location and/or use case constraints associated with traditional WMNs, and/or does not require an internet connection or a social media account.

The present disclosure provides a solution to the constraints associated with WMNs and traditional social networking by enabling a user's device (e.g., smartphone, smart vehicle, wireless speaker system, etc.) to obtain access credentials for all of the devices that make up a social mesh network when the user initially joins the social mesh network.

By providing the user's device with the access credentials for all of the devices that make up a social mesh network, a user may be able to communicate with other users (e.g., using short-range communications) in the social mesh network without accessing a traditional WMN, accessing the internet, or signing up for a social media account.

Figure 3:
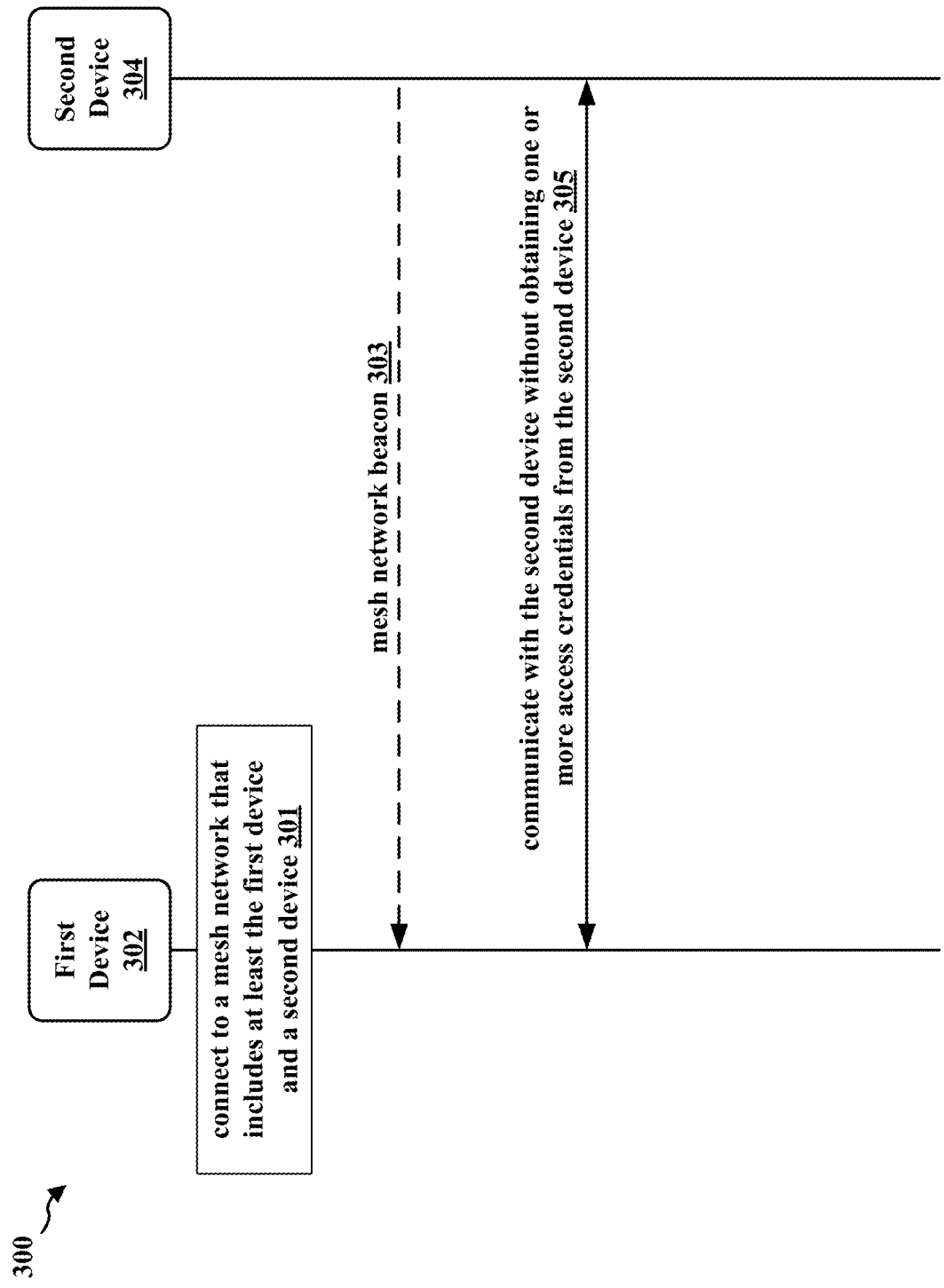
FIG. 3 illustrates a data flow that may be used to enable communication between wireless devices in a social mesh network without obtaining access credentials in accordance with certain aspects of the disclosure.

FIG. 3 illustrates a data flow 300 that may be used to enable communication between wireless devices in a social mesh network in accordance with certain aspects of the disclosure. The social mesh network may include at least a first device 302 and a second device 304. The first device 302 may correspond to, e.g., wireless mesh node 102, wireless mesh client device 104, wireless device 200, first device 402, 502, 1050, 1650, second device 404, 504, 1055, 1655, the apparatus 702/702', 1302/1302'. The second device 304 may correspond to, e.g., wireless mesh node 102, wireless mesh client device 104, wireless device 200, first device 402, 502, 1050, 1650, second device 404, 504, 750, 1055, 1655, the apparatus 702/702', 1302/1302'.

In certain configurations, the first device 302 may connect (at 301) to a social mesh network that includes at least the second device 304. For example, the first device 302 may connect to the social mesh network in order to communicate with other devices (e.g., the second device 304) in the social mesh network. The first device 302 may connect (at 301) to the social mesh network when a user of the first device 302 correctly enters, e.g., a passcode associated with the social mesh network at the first device 302, or receives an electronic invitation (e.g., a web link) that enables access to an internet site for the social mesh network.

When the first device 302 connects (at 301) to the social mesh network for the first time, access credentials (e.g., WLAN password information, BT pairing information, encryption keys, device identifiers (IDs), etc.) for all of the devices in the social mesh network may be communicated to the first device 302. In certain aspects, the access credentials may also include an access credential that is associated with a social mesh network beacon that is broadcast/transmitted by the devices in the social mesh network that may be used for mesh network device discovery. The access credentials may be communicated to the first device 302, e.g., by another device in the social mesh network and/or by a mesh network entity (e.g., a remote server) that uses Wi-Fi, BT, and/or cellular communications to communicate the access credentials.

In certain configurations, the first device 302 may maintain a look-up table that includes information associated with a mesh network beacon, and a correlation between each device in the social mesh network and respective access credentials. Furthermore, the first device 302 may communicate access credentials associated with the first device 302 to the social mesh network so that other devices may connect to the first device 302.

In certain configurations, the first device 302 may receive a mesh network beacon (at 303) associated with the social mesh network from the second device 304. The social mesh network beacon may indicate to the first device 302 that the second device 304 is part of the social mesh network, and is available for connection/communication.

In certain configurations, the first device 302 may communicate (at 305) with the second device 304 without obtaining one or more access credentials from the second device 304. For example, the first device 302 may communicate (at 305) with the second device 304 using the access credentials maintained in the look-up table without receiving the access credentials directly from the second device 304. In certain aspects, the first device 302 may communicate (at 307) with the second device 304 when the social mesh network beacon is received (at 303).

In certain configurations, when the second device 304 is a WLAN device (e.g., an AP), the first device 302 may be able to communicate using a secure Wi-Fi connection at the second device 304 using a Wi-Fi password (e.g., access credential) that was communicated to the first device 302 upon initial connection (at 301) to the social mesh network and maintained in the look-up table.

In certain other configurations, when the second device 304 is a BT enabled device (e.g., wireless speakers, BT enabled vehicle, etc.), the first device 302 may be able to communicate with the second device 304 using the BT device ID and encryption key (e.g., access credentials) associated with the second device 304 without performing BT pairing.

Prior to communicating with the second device 304, the first device 302 may determine if the mesh network beacon is associated with social mesh network that the first device 302 is a part of, and obtain the access credentials for the second device 304 from the look-up table.

As a first illustrative example, assume Bob's smartphone (e.g., the first device 302) and Steve's wireless speaker system (e.g., the second device 304) are both part of a "Football Social Mesh Network," and that Bob is at Steve's house. In such a use case, Bob may be able to access a song from his smartphone (e.g., the first device 302) and click "Play on Football Social Mesh Speaker" (e.g., Steve's wireless speaker system) in order to play the song without first acquiring the access credentials (e.g., perform BT pairing) for Steve's wireless speaker system (e.g., the second device 304).

As a second illustrative example, assume Bob's smartphone (e.g., the first device 302) and Steve's car (e.g., the second device 304) are both part of a "Football Social Mesh Network," and that Bob and Steve are traveling to a store in Steve's car. In such a use case, Bob may be able to access a navigation application on his smartphone (e.g., the first device) for directions to the store. Bob may be able to click "Start Navigation" in the navigation application, and Steve's car will receive the navigational information from Bob's smartphone (e.g., the first device 302) without first performing BT pairing with Steve's car (e.g., the second device 304).

Figure 4:
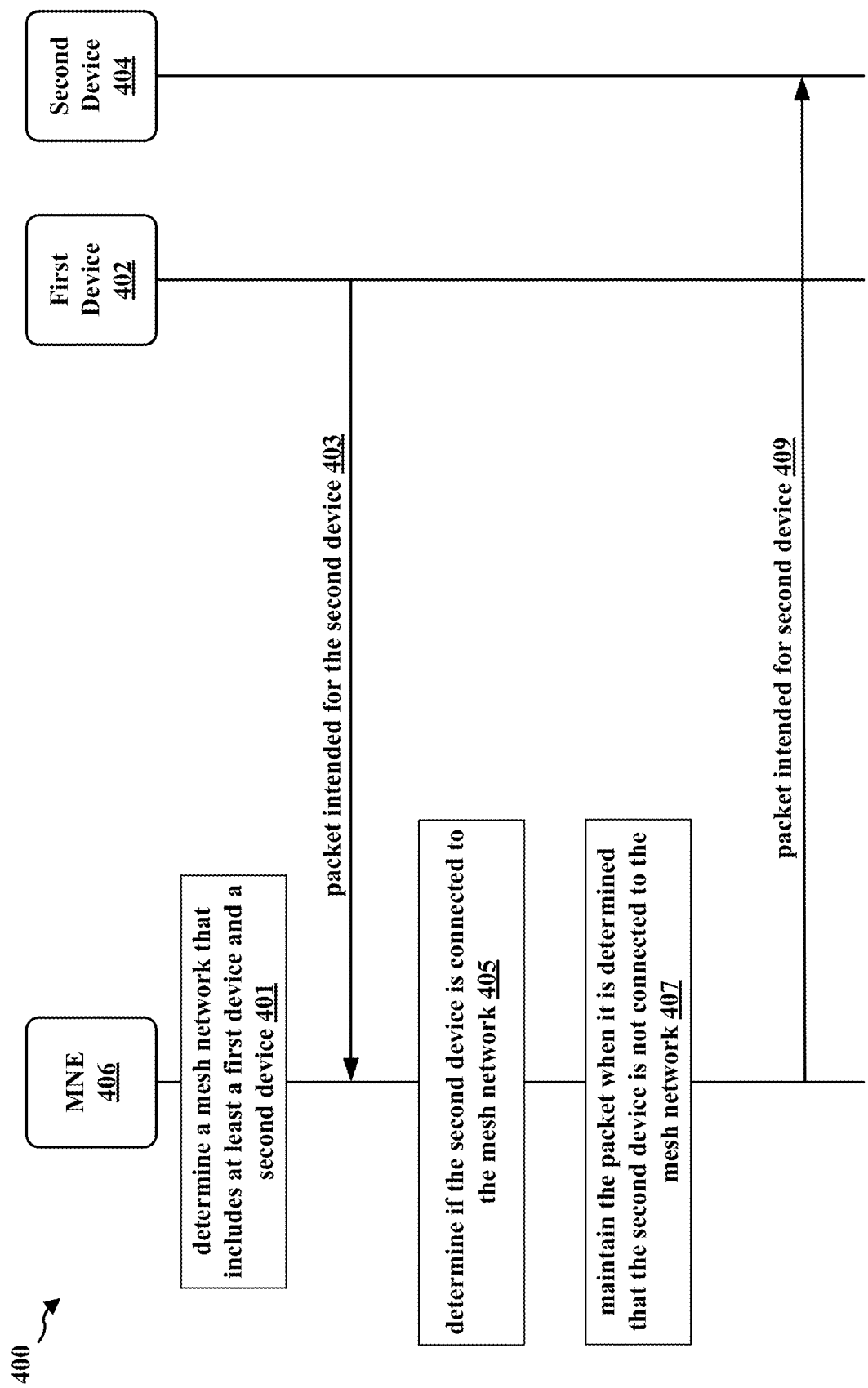
FIG. 4 illustrates a data flow that may be used to forward messages between devices in a social mesh network in accordance with certain aspects of the disclosure.

FIG. 4 illustrates a data flow 400 that may be used to forward messages between devices in a social mesh network in accordance with certain aspects of the disclosure. The social mesh network may include at least a first device 402 and a second device 404. The first device 402 and the second device 404 may be in communication (e.g., WLAN communication, short-range communication, and/or cellular communication, etc.) with a mesh network entity (MNE) 406. The first device 402 may correspond to, e.g., wireless mesh node 102, wireless mesh client device 104, wireless device 200, first device 302, 502, 1050, 1650, second device 304, 504, 1055, 1655, the apparatus 702/702', 1302/1302'. The second device 404 may correspond to, e.g., wireless mesh node 102, wireless mesh client device 104, wireless device 200, first device 302, 502, 1050, 1650, second device 304, 504, 750, 1055, 1655, the apparatus 702/702', 1302/1302'. The MNE 406 may correspond to, e.g., wireless mesh node 102, wireless mesh client device 104, wireless device 200, MNE 506, 1350, the apparatus 1002/1002', 1602/1602'. In certain aspects, the MNE 406 may be a remote server or a remote device that maintains information associated with the social mesh network.

In certain configurations, the MNE 406 may determine (at 401) a mesh network that includes at least the first device 402 and the second device 404. For example, the MNE 406 may determine which devices are part of the social mesh network, and maintain information that correlates access credentials to respective devices in the social mesh network. When devices are added and/or removed from the social mesh network, the MNE 406 may be responsible for communicating updated information indicating the addition or removal of a device to all of the other devices in the social mesh network. In addition, the MNE 406 may have access to social mesh network profiles associated with each device in the social mesh network that indicates if a device is currently available for communications within the social mesh network.

The MNE 406 may receive (at 403), from the first device 402, a packet intended for the second device 404. For example, the packet may include a text message, an audio file, a video file, navigational instructions, etc.

In certain configurations, the MNE 406 may determine (at 405) if the second device 404 is connected to the social mesh network. For example, the MNE 406 may access a social mesh network profile associated with the second device 404 to determine if the second device 404 is connected to the social network, and is able to receive relayed packets. When it is determined (at 405) that the second device 404 is not connected to the social mesh network, the MNE 406 may be configured to check the connection status of the second device 1055 at predetermined intervals (e.g., 5 ms, 1 second, 1 minute, 5 minutes, 10 minutes, etc.).

In certain other configurations, the MNE 406 may maintain (at 407) the packet when it is determined (at 405) that the second device 404 is not connected to the social mesh network. For example, the MNE 406 may maintain (at 407) the packet in a buffer.

The MNE 406 may communicate (at 409) the packet to the second device 404 when it is determined the second device 404 is connected to the social mesh network. For example, the MNE 406 may communicate (at 409) the packet to the second device 404 via WLAN communications, short-range communications, cellular communications, etc.

Figure 5:
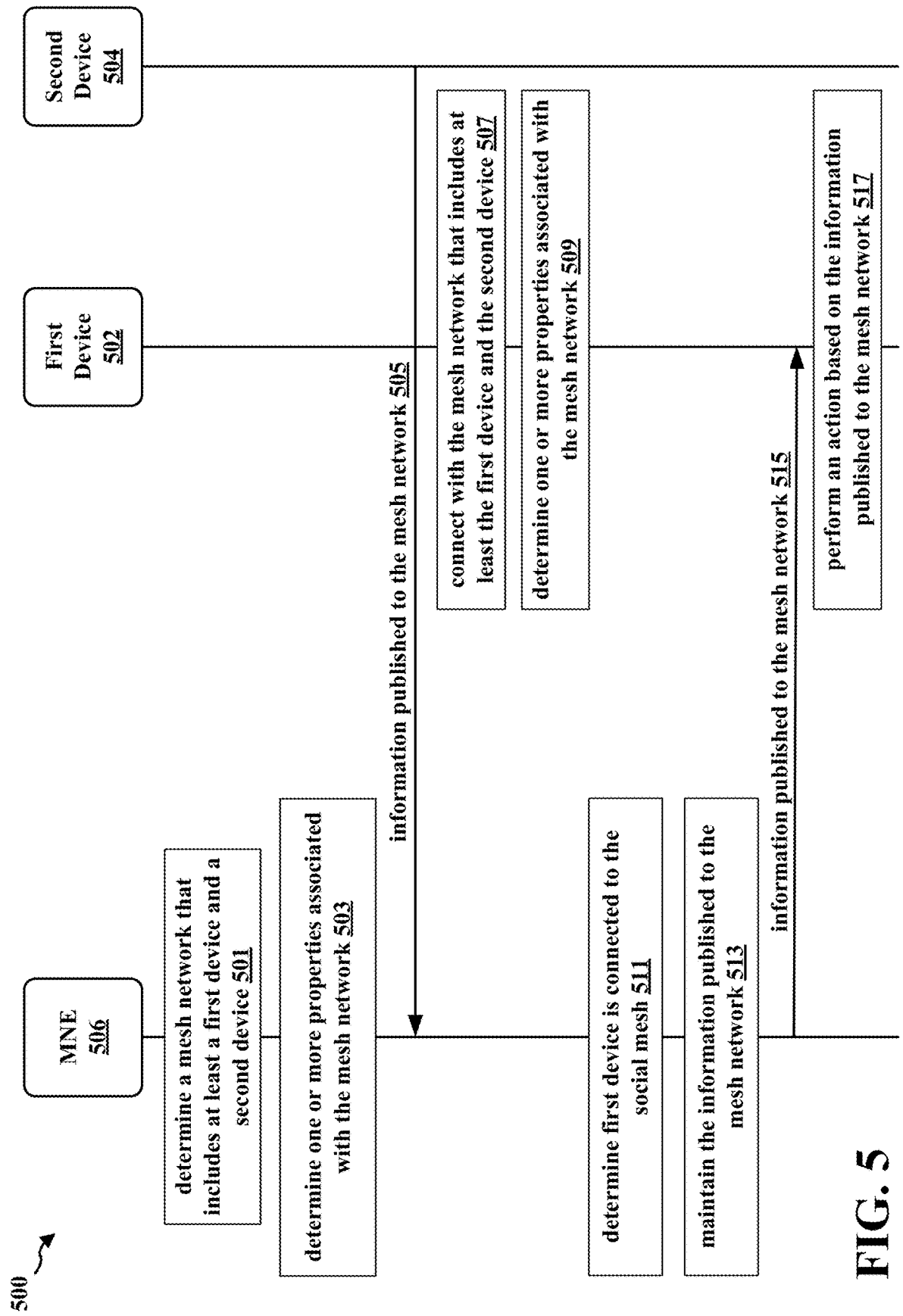
FIG. 5 illustrates a data flow that may be used to communicate information published to the social mesh network in accordance with certain aspects of the disclosure.

FIG. 5 illustrates a data flow 500 that may be used to communicate information published to the social mesh network in accordance with certain aspects of the disclosure. The social mesh network may include at least a first device 502 and a second device 504. The first device 502 and the second device 504 may be in communication (e.g., WLAN communication, short-range communication, and/or cellular communication, etc.) with a MNE 506. The first device 502 may correspond to, e.g., wireless mesh node 102, wireless mesh client device 104, wireless device 200, first device 302, 402, 1050, 1650, second device 304, 404, 1055, 1655, the apparatus 702/702', 1302/1302'. The second device 504 may correspond to, e.g., wireless mesh node 102, wireless mesh client device 104, wireless device 200, first device 302, 402, 1050, 1650, second device 304, 404, 750, 1055, 1655, the apparatus 702/702', 1302/1302'. The MNE 506 may correspond to, e.g., wireless mesh node 102, wireless mesh client device 104, wireless device 200, MNE 406, 1350, the apparatus 1002/1002', 1602/1602'. In certain aspects, the MNE 506 may be a remote server or a remote device that maintains information associated with the social mesh network.

In certain configurations, the MNE 506 may determine (at 501) a mesh network that includes at least the first device 502 and the second device 504. For example, the MNE 506 may determine which devices are part of the social mesh network, and maintain information that correlates access credentials to respective devices in the social mesh network. When devices are added and/or removed from the social mesh network, the MNE 506 may be responsible for communicating updated information indicating the addition or removal of a device to all of the other devices in the social mesh network. In addition, the MNE 506 may have access to social mesh network profiles associated with each device in the social mesh network that indicates if a device is currently available for communications within the social mesh network.

In certain configurations, the MNE 506 may determine (at 503) one or more properties associated with the social mesh network. In certain aspects, the MNE 506 may maintain information related to properties of a social mesh network. The properties associated with the social mesh network may be set by a user of one of the devices within the social mesh network.

For example, the properties may include, e.g., play a music uniform resource locator (URL) when a device connects to the social mesh network or is in communication range with another device, show image URL when a device connects to the social mesh network or is in communication range with another device, start navigation (latitude/longitude) when a device connects to the social mesh network or is in communication range with another device, etc.

In certain aspects, the properties may specify that a vehicle, speaker system, display may be included in a social mesh network either permanently or temporarily, etc. For example, a rental car and/or devices in a hotel room may be temporarily included as part of a social mesh. Thus, the properties associated with the social mesh network may be that the rental car and/or devices in the hotel room are part of the social mesh network until a particular date and/or time. Once the particular day or time is reached, the MNE 506 may remove the rental car and/or devices from the social mesh network.

In certain configurations, the MNE 506 may receive (at 505) information published by the second device 504 to the social mesh network. For example, the information published by the second device 504 may include one or more of an image file, a video file, an audio file, navigation information, etc. In certain aspects, a user associated with the social mesh network may be able to access his or her social mesh network account from a second device 504 that is not registered with the social mesh network (e.g., a desktop computer). In such a scenario, the information published using a device that is not part of the social mesh network will be published by the MNE 506 to the devices in the social mesh network.

In certain configurations, the first device 502 may connect (at 507) with the social mesh network that includes the second device 504. For example, the connection (at 507) to the social mesh network may be an initial connection when the first device 502 first joins the social mesh network, or a subsequent connection after the initial connection.

The first device 502 may determine (at 509) one or more properties associated with the social mesh network. For example, the first device 502 may determine (at 509) that information published to the social mesh network is automatically displayed upon connecting to the social mesh network. The first device 502 may maintain information associated with the one or more properties associated with the wireless mesh. In certain other aspects, the first device 502 may receive signaling (e.g., from the MNE 506 or another device in the social mesh network) that indicates the properties associated with the wireless mesh network when the first device 502 connects to the wireless mesh network.

In certain other configurations, the MNE 506 may determine (at 511) if the first device 502 is connected to the social mesh network. For example, the MNE 506 may access a social mesh network profile associated with the first device 502 to determine if the first device 502 is connected to the social network, and able to receive published information. When it is determined (at 511) that the first device 502 is not connected to the social mesh network, the MNE 506 may be configured to determine the connection status of the first device 502 at predetermined intervals (e.g., 5 ms, 1 second, 1 minute, 5 minutes, 10 minutes, etc.). The MNE may maintain (at 513) the published information until the first device 502 connects to the social mesh network.

In certain other configurations, the MNE 506 may transmit (at 515), to the first device 502, the information published by the second device 504 when it is determined (at 511) that the first device 502 is connected to the social mesh network.

The first device 502 may perform (at 517) an action based on the information published by the second device 504 and the one or more properties associated with the social mesh network. In one aspect, the one or more properties may indicate that the first device 502 is to display an image, video, or perform navigation that was published by the second device 504 to the social mesh network upon connecting to the social mesh network.

Figure 6:
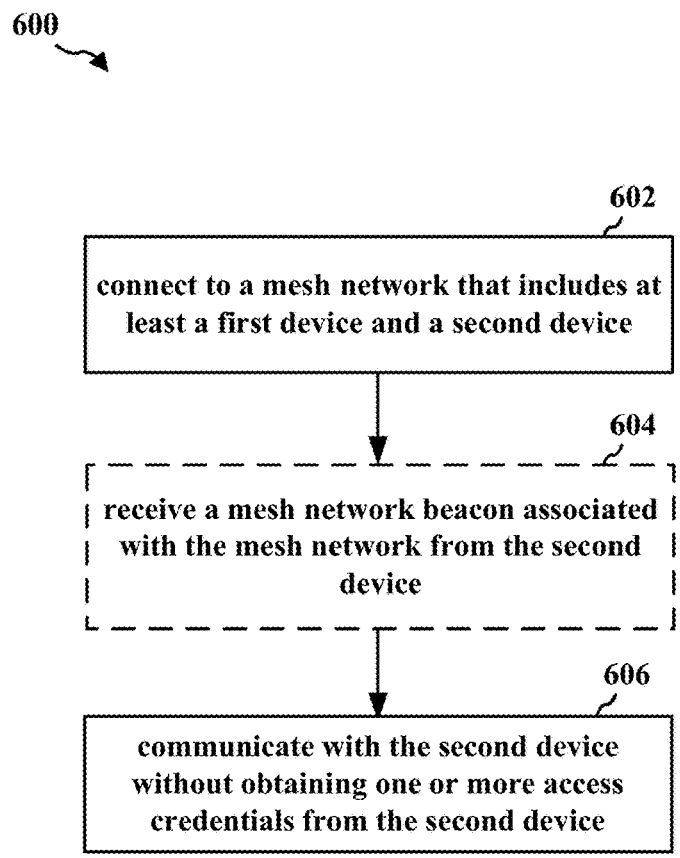
FIG. 6 is a flowchart of a method of wireless communication.

FIG. 6 is a flowchart 600 of a method of wireless communication. The method may be performed by a first device (e.g., wireless mesh node 102, wireless mesh client device 104, wireless device 200, first device 402, 502, 1050, 1650, second device 404, 504, 1055, 1655, the apparatus 802/802', 1302/1302'). In FIG. 6, optional operations are indicated with dashed lines.

At 602, the first device may connect to a mesh network that includes at least the first device and a second device. For example, referring to FIG. 3, the first device 302 may connect (at 301) to a social mesh network that includes at least the second device 304. For example, the first device 302 may connect to the social mesh network in order to communicate with other devices (e.g., the second device 304) in the social mesh network. The first device 302 may connect (at 301) to the social mesh network when a user of the first device 302 correctly enters, e.g., a passcode associated with the social mesh network at the first device 302, or receives an electronic invitation (e.g., a web link) that enables access to an internet site for the social mesh network. When the first device 302 connects (at 301) to the social mesh network for the first time, access credentials (e.g., WLAN password information, BT pairing information, encryption keys, device identifiers (IDs), etc.) for all of the devices in the social mesh network may be communicated to the first device 302. In certain aspects, the access credentials may also include an access credential that is associated with a social mesh network beacon that is broadcast/transmitted by the devices in the social mesh network that may be used for mesh network device discovery. The access credentials may be communicated to the first device 302, e.g., by another device in the social mesh network and/or by a mesh network entity (e.g., a remote server) that uses Wi-Fi, BT, and/or cellular communications to communicate the access credentials. In certain configurations, the first device 302 may maintain a look-up table that includes information associated with a mesh network beacon, and a correlation between each device in the social mesh network and respective access credentials. Furthermore, the first device 302 may communicate access credentials associated with the first device 302 to the social mesh network so that other devices may connect to the first device 302.

At 604, the first device may receive a mesh network beacon associated with the social mesh network from the second device. For example, referring to FIG. 3, the first device 302 may receive a mesh network beacon (at 303) associated with the social mesh network from the second device 304. The social mesh network beacon may indicate to the first device 302 that the second device 304 is part of the social mesh network, and is available for connection/communication.

At 606, the first device may communicate with the second device without receiving the access credentials from the second device. For example, referring to FIG. 3, In certain configurations, the first device 302 may communicate (at 305) with the second device 304 without obtaining one or more access credentials from the second device 304. For example, the first device 302 may communicate (at 305) with the second device 304 using the access credentials maintained in the look-up table without receiving the access credentials directly from the second device 304. In certain aspects, the first device 302 may communicate (at 307) with the second device 304 when the social mesh network beacon is received (at 303). In certain configurations, when the second device 304 is a WLAN device (e.g., an AP), the first device 302 may be able to communicate using a secure Wi-Fi connection at the second device 304 using a Wi-Fi password (e.g., access credential) that was communicated to the first device 302 upon initial connection (at 301) to the social mesh network and maintained in the look-up table. In certain other configurations, when the second device 304 is a BT enabled device (e.g., wireless speakers, BT enabled vehicle, etc.), the first device 302 may be able to communicate with the second device 304 using the BT device ID and encryption key (e.g., access credentials) associated with the second device 304 without performing BT pairing. Prior to communicating with the second device 304, the first device 302 may determine if the mesh network beacon is associated with social mesh network that the first device 302 is a part of, and obtain the access credentials for the second device 304 from the look-up table.

Figure 7:
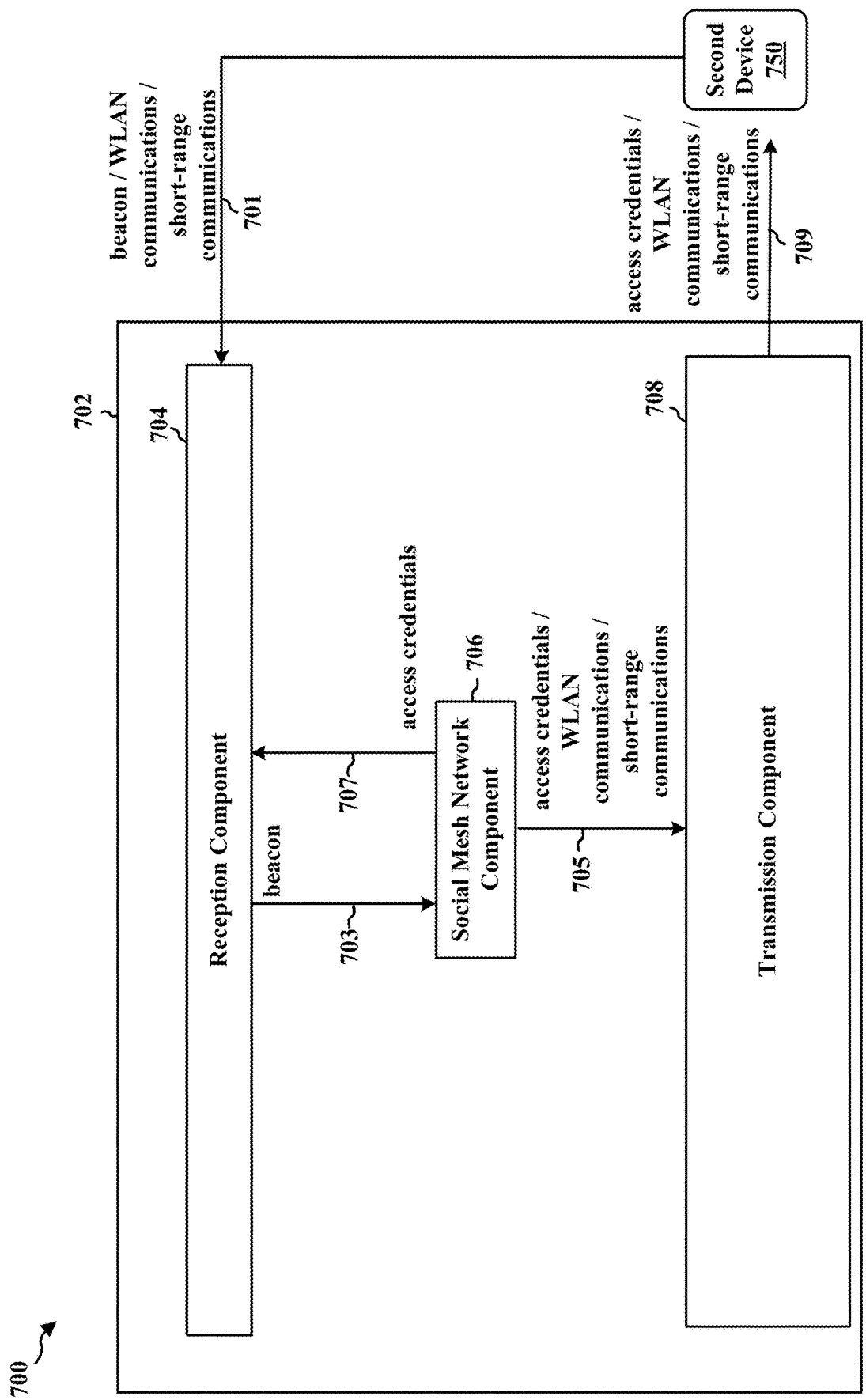
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a first device (e.g., wireless mesh node 102, wireless mesh client device 104, wireless device 200, first device 302, 402, 502, 1050, 1650, second device 304, 404, 504, 850, 1055, 1655, the apparatus 702', 1302/1302') in communication with a second device 750 (e.g., wireless mesh node 102, wireless mesh client device 104, wireless device 200, first device 302, 402, 502, 1050, 1650, second device 304, 404, 504, 1055, 1655, the apparatus 1302/1302'). The apparatus may include a reception component 704, a social mesh network component 706, and a transmission component 708.

In certain configurations, the social mesh network component 706 may be configured to connect to a social mesh network that includes at least the first device and a second device 750. For example, the social mesh network component 706 may be configured to access and/or maintain information associated with a mesh network beacon for the social mesh network and/or a look-up table that correlated respective access credentials for all of the devices in the social mesh network.

The reception component 704 may be configured to receive a social mesh network beacon 701 associated with the social mesh network from the second device 750. The reception component 704 may be configured to send a signal associated with the social mesh network beacon to the social mesh network component 706.

The social mesh network component 706 may be configured to connect to the second device without obtaining one or more access credentials from the second device. In certain aspects, the social mesh network component 706 may be configured to connect to the second device without obtaining the one or more access credentials from the second device when the signal 703 associated with mesh network beacon is received from the reception component 704. In certain other aspects, the one or more access credentials include at least one of WLAN credentials and short-range communication credentials.

In certain configurations, the social mesh network component 706 may be configured to determine which social mesh network the second device 750 is broadcasting based on the social mesh network beacon. In certain other configurations, the social mesh network component 706 may be configured to access a look-up table associated with the social mesh network being broadcast by the second device 750. In certain other configurations, the social mesh network component 706 may be configured to determine the access credentials associated with the second device 750 based on the information in the look-up table. The social mesh network component 706 may be configured to send a signal 705, 707 to one or more of the transmission component 708 and/or the reception component 704.

One or more of the reception component 704, the social mesh network component 706, and/or the transmission component 708 may be configured to communicate with the second device 750. For example, the social mesh network component 706 may be configured to generate data packets intended for another device in a particular social network, and send a signal 705 associated with the data packet (e.g., WLAN communications and/or short-range communications) to the transmission component 708. The transmission component 708 may be configured to transmit the data packets 709 to the second device 750. The reception component 704 may be configured to receive one or more data packets (e.g., WLAN communications and/or short-range communications) from the second device 750.

The apparatus may include additional components that perform each of the blocks of the algorithm in the aforementioned flowcharts of FIG. 6. As such, each block in the aforementioned flowcharts of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
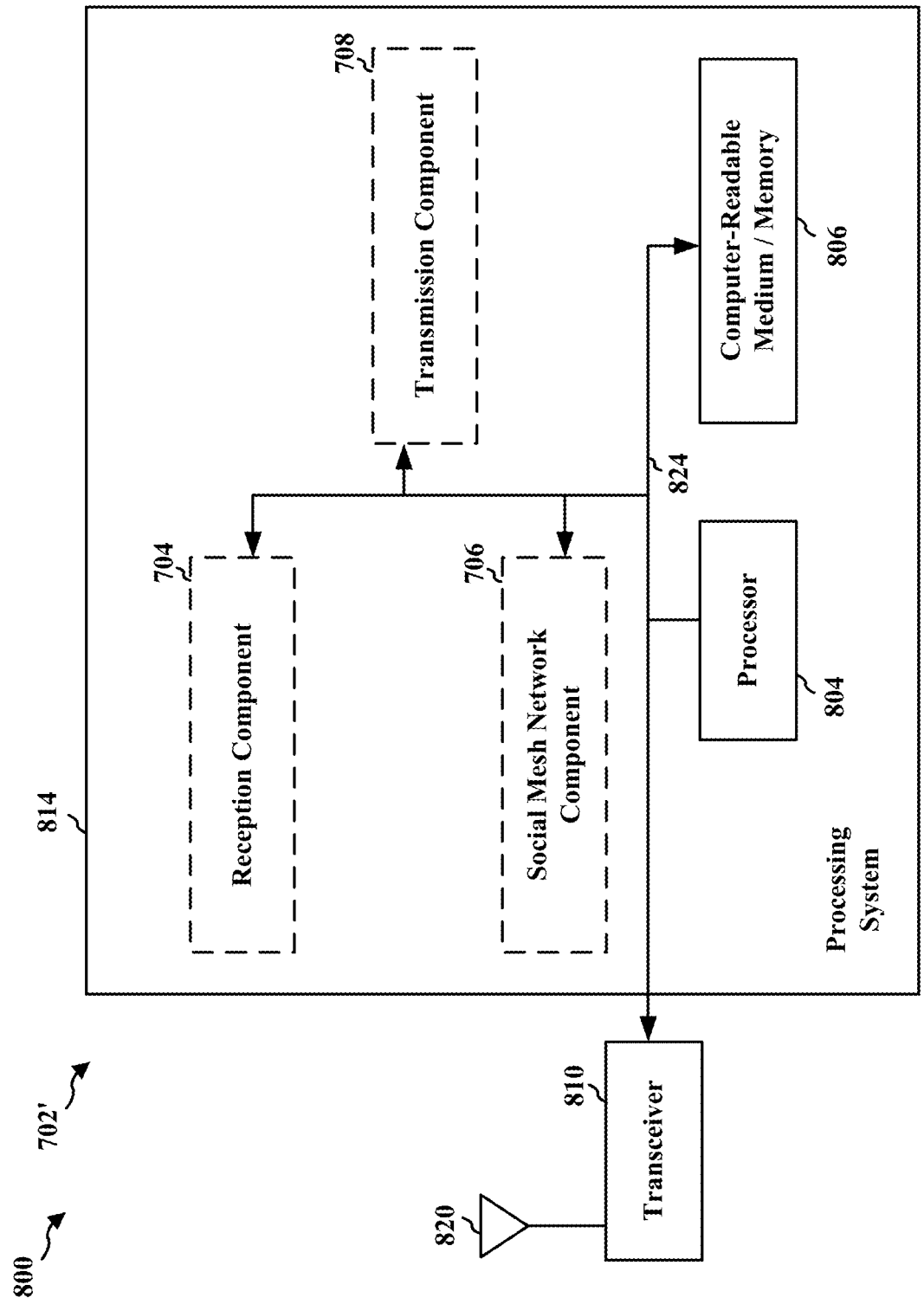
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 708, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708. The components may be software components running in the processor 804, resident/stored in the computer readable medium/memory 806, one or more hardware components coupled to the processor 804, or some combination thereof.

In certain configurations, the apparatus 702/702' for wireless communication may include means for connecting to a social mesh network that includes at least the first device and a second device. In certain configurations, the apparatus 702/702' for wireless communication may include means for receiving information associated with a mesh network beacon for the social mesh network. In certain other configurations, the apparatus 702/702' for wireless communication may include means for accessing information that correlates respective access credentials for all of the devices in the social mesh network. In certain other configurations, the apparatus 702/702' for wireless communication may include means for maintaining information that correlates respective access credentials for all of the devices in the social mesh network. In certain aspects, the information that correlates respective access credentials for all of the devices in the social mesh network may be maintained in a look-up table. In certain other aspects, the one or more access credentials include at least one of WLAN credentials and short-range communication credentials.

In certain other configurations, the apparatus 702/702' for wireless communication may include means for receiving a social mesh network beacon associated with the social mesh network from the second device.

In certain other configurations, the apparatus 702/702' for wireless communication may include means for connecting to the second device without obtaining one or more access credentials from the second device. In certain other configurations, the means for connecting to the second device without obtaining the one or more access credentials from the second device may be configured to connected to the second device when the social mesh network beacon is received.

In certain other configurations, the apparatus 702/702' for wireless communication may include means for determining which social mesh network the second device is broadcasting based on the social mesh network beacon. In certain aspects, the means for accessing the information may be configured to access a look-up table associated with the social mesh network being broadcast by the second device. In certain other configurations, the apparatus 702/702' for wireless communication may include means for determining the access credentials associated with the second device based on the information in the look-up table.

In certain other configurations, the apparatus 702/702' for wireless communication may include means for communicating with the second device.

The aforementioned means may be one or more of the aforementioned processor(s) 202, WLAN controller 250, short-range communications controller 252, and/or radio 230 in FIG. 2, components of the apparatus 702 and/or the processing system 814 of the apparatus 702' configured to perform the functions recited by the aforementioned means.

Figure 9:
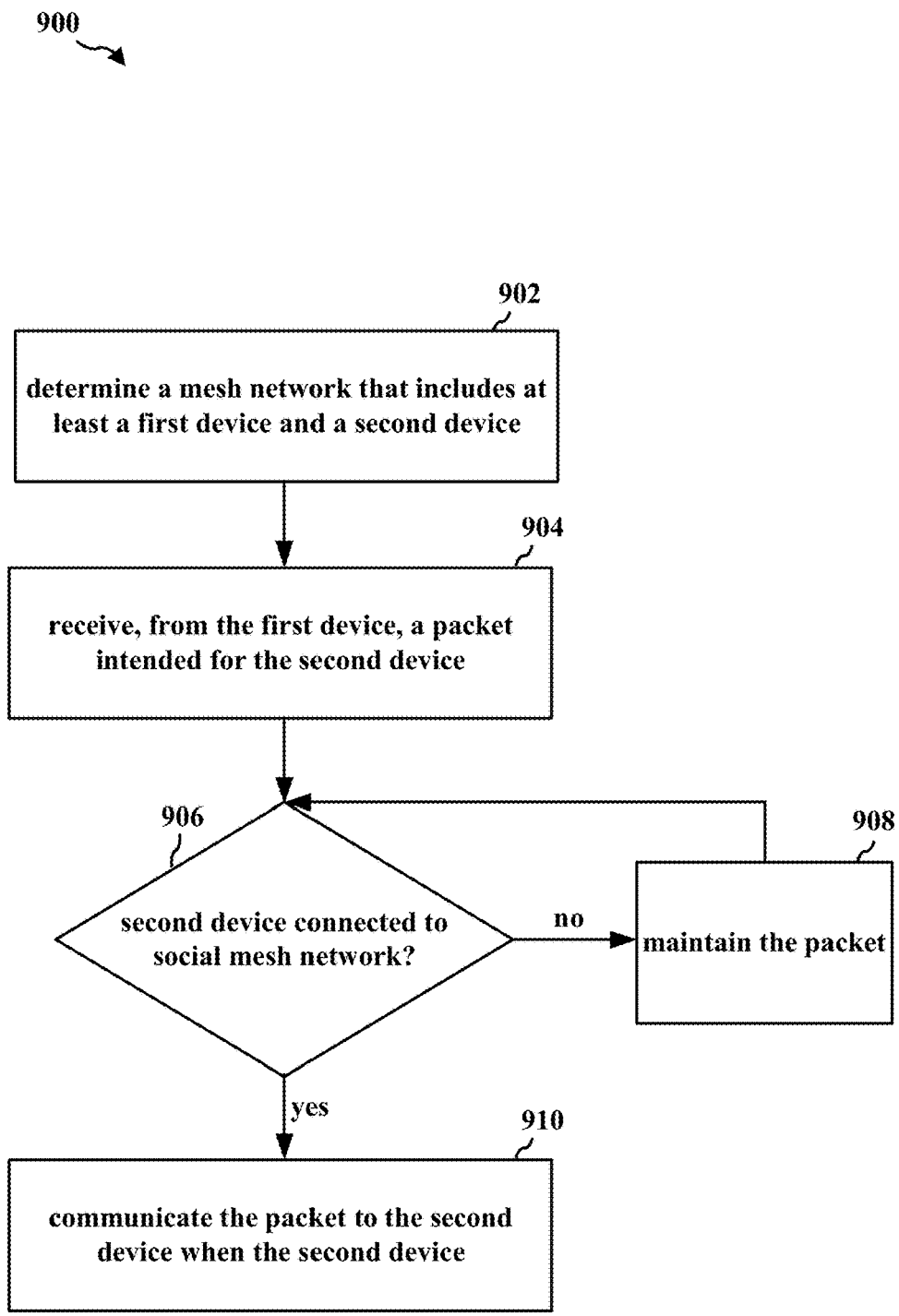
FIG. 9 is a flowchart of a method of wireless communication.

FIG. 9 is a flowchart 900 of a method of wireless communication. The method may be performed by a MNE (e.g., wireless mesh node 102, wireless mesh client device 104, wireless device 200, MNE 506, 1350, the apparatus 1002/1002', 1602/1602').

At 902, the MNE may determine a mesh network that includes at least a first device and a second device. For example, referring to FIG. 4, the MNE 406 may determine (at 401) a mesh network that includes at least the first device 402 and the second device 404. For example, the MNE 406 may determine which devices are part of the social mesh network, and maintain information that correlates access credentials to respective devices in the social mesh network. When devices are added and/or removed from the social mesh network, the MNE 406 may be responsible for communicating updated information indicating the addition or removal of a device to all of the other devices in the social mesh network. In addition, the MNE 406 may have access to social mesh network profiles associated with each device in the social mesh network that indicates if a device is currently available for communications within the social mesh network.

At 904, the MNE may receive, from the first device, a packet intended for the second device. For example, referring to FIG. 4, the MNE 406 may receive (at 403), from the first device 402, a packet intended for the second device 404. For example, the packet may include a text message, an audio file, a video file, navigational instructions, etc.

At 906, the MNE may determine if the second device is connected to the social mesh network. For example, referring to FIG. 4, the MNE 406 may determine (at 405) if the second device 404 is connected to the social mesh network. For example, the MNE 406 may access a social mesh network profile associated with the second device 404 to determine if the second device 404 is connected to the social network, and is able to receive relayed packets. When it is determined (at 405) that the second device 404 is not connected to the social mesh network, the MNE 406 may be configured to check the connection status of the second device 1055 at predetermined intervals (e.g., 5 ms, 1 second, 1 minute, 5 minutes, 10 minutes, etc.).

When it is determined (at 906) that the second device is not connected to the social mesh network, the operation may move to 908. Otherwise, when it is determined (at 906) that the second device is connected to the social mesh network, the operation may move to 910.

At 908, the MNE may maintain the packet when it is determined that the second device is not connected to the social mesh network. For example, referring to FIG. 4, the MNE 406 may maintain (at 407) the packet when it is determined (at 405) that the second device 404 is not connected to the social mesh network. For example, the MNE 406 may maintain (at 407) the packet in a buffer.

At 910, the MNE may communicate the packet to the second device when it is determined the second device is connected to the social mesh network. For example, referring to FIG. 4, the MNE 406 may communicate (at 409) the packet to the second device 404 when it is determined the second device 404 is connected to the social mesh network. For example, the MNE 406 may communicate (at 409) the packet to the second device 404 via WLAN communications, short-range communications, cellular communications, etc.

Figure 10:
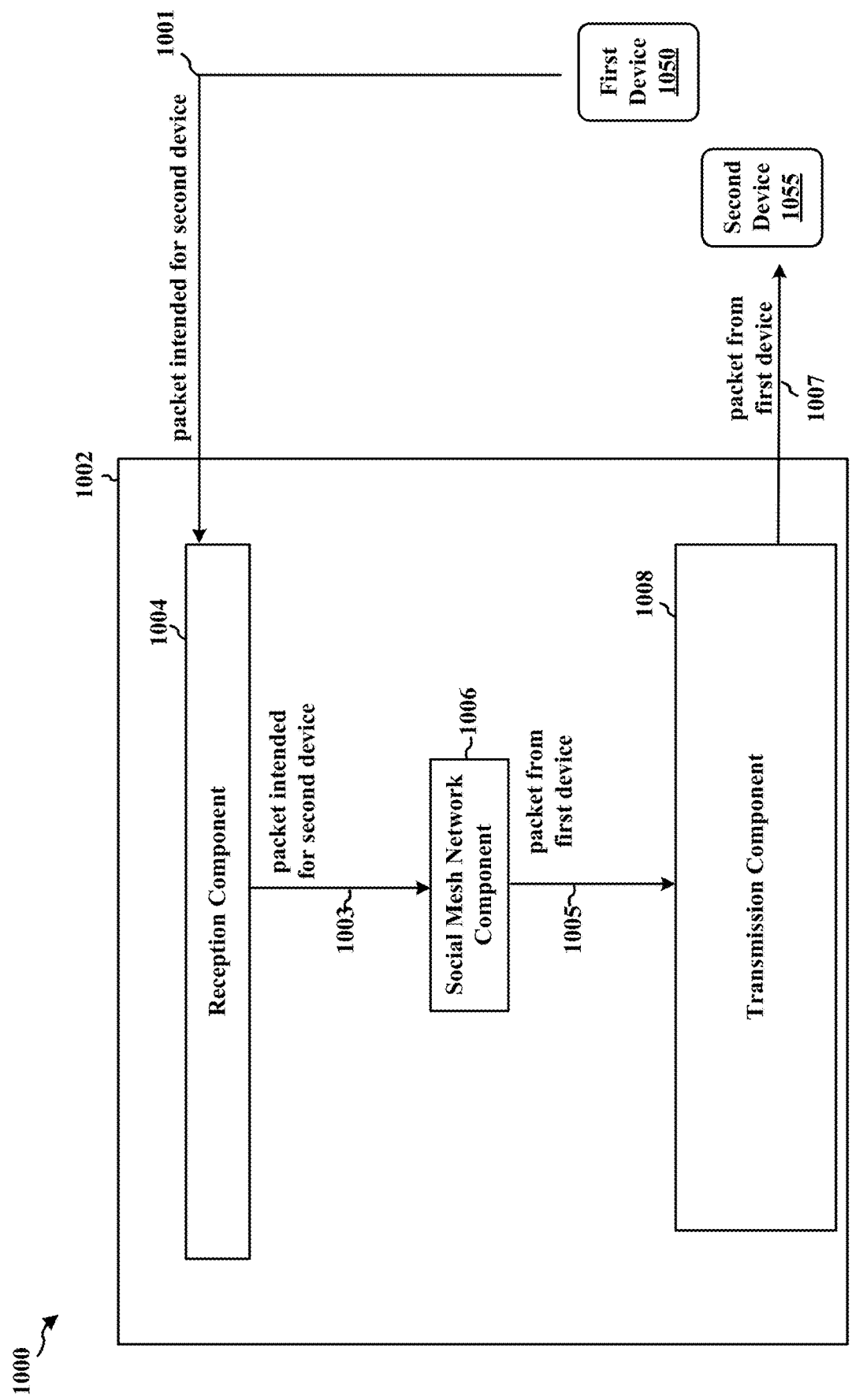
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a MNE (e.g., wireless mesh node 102, wireless mesh client device 104, wireless device 200, MNE 506, 1350, the apparatus 1002/1002', 1602/1602') in communication with a first device 1050 (e.g., wireless mesh node 102, wireless mesh client device 104, wireless device 200, first device 302, 402, 502, 1650, second device 304, 404, 504, 850, 1055, 1655, the apparatus 702/702', 1302/1302') in communication with a second device 1055 (e.g., wireless mesh node 102, wireless mesh client device 104, wireless device 200, first device 302, 402, 502, 1050, 1650, second device 304, 404, 504, 1655, the apparatus 1302/1302'). The apparatus may include a reception component 1004, a social mesh network component 1006, and a transmission component 1008.

In certain configurations, the social mesh network component 1006 may be configured to determine a mesh network that includes at least the first device 1050 and a second device 1055. The social mesh network component 1006 may be configured to maintain information associated with access credentials of the devices in the social mesh network. The social mesh network component 1006 may be configured to access social mesh network profiles associated with each device in a social mesh network. The social mesh network profiles may indicate to the social mesh network component 1006 which devices are connected to the social mesh network and available to receive communications via the social mesh network.

In certain other configurations, the reception component 1004 may be configured to receive, from the first device 1050, a packet 1001 intended for the second device 1055. The reception component 1004 may be configured to send a signal 1003 associated with the packet intended for the second device 1055 to the social mesh network component 1006.

In certain other configurations, the social mesh network component 1006 may be configured to determine if the second device 1055 is connected to the social mesh network. For example, the social mesh network component 1006 may be configured to access the social mesh profile associated with the second device 1055 to determine if the second device 1055 is connected to social mesh network.

In certain other configurations, the social mesh network component 1006 may be configured to maintain the packet when it is determined that the second device 1055 is not connected to the social mesh network. When it is determined that the second device 1055 is not connected to the social mesh network, the social mesh network component 1006 may be configured to check the connection status of the second device 1055 at predetermined intervals (e.g., 5 ms, 1 second, 1 minute, 5 minutes, 10 minutes, etc.).

In certain other configurations, the social mesh network component 1006 may be configured to send a signal 1005 associated with the packet received from the first device 1050 to the transmission component 1008 when it is determined that the second device 1055 is connected to the social mesh network.

In certain configurations, the transmission component 1008 may be configured to communicate the packet to the second device when it is determined the second device is connected to the mesh network The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
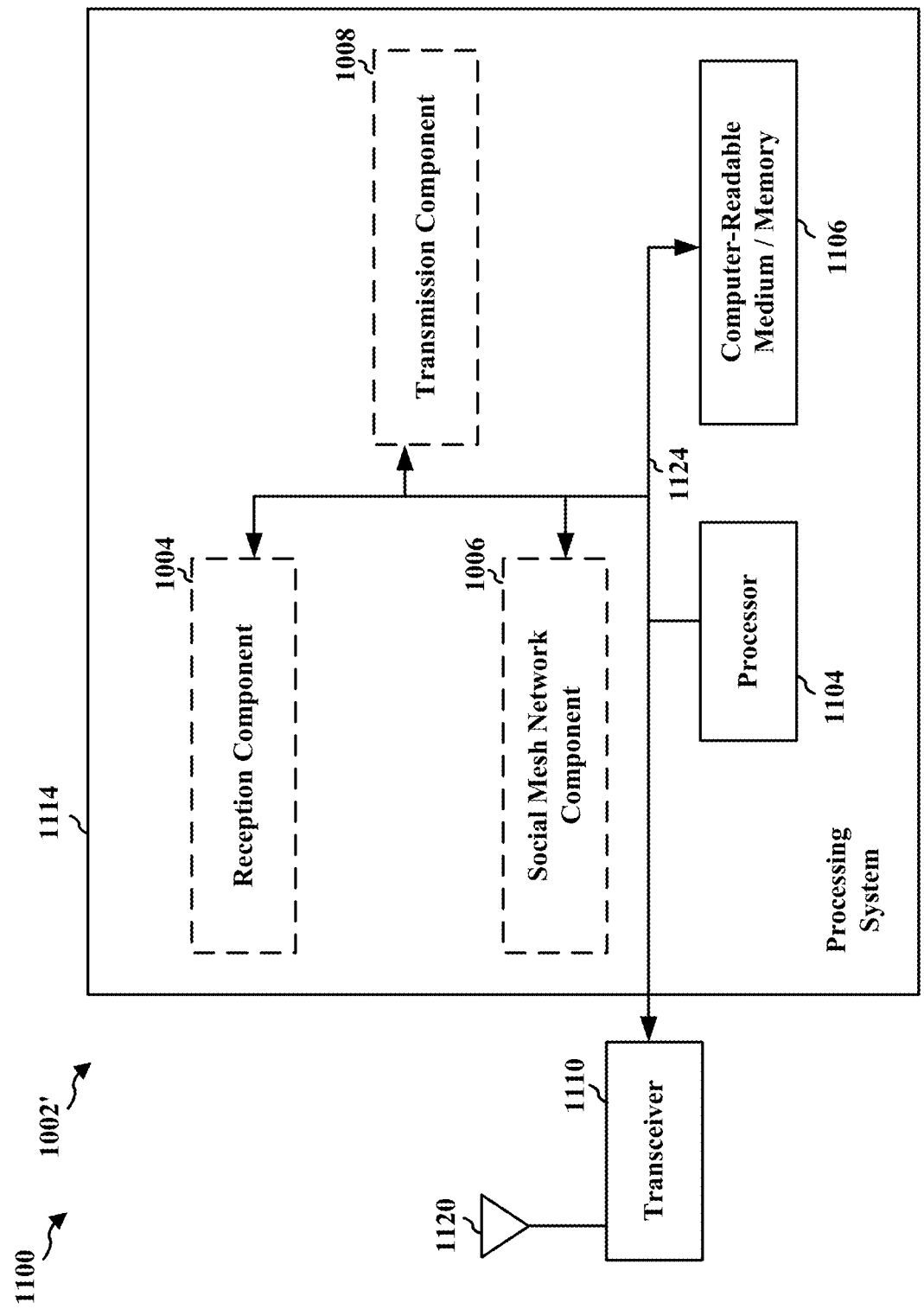
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1008, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008. The components may be software components running in the processor 1104, resident/stored in the computer readable medium/memory 1106, one or more hardware components coupled to the processor 1104, or some combination thereof.

In certain configurations, the apparatus 1002/1002' for wireless communication may include means for determining a mesh network that includes at least a first device and a second device. In certain other configurations, the apparatus 1002/1002' for wireless communication may include means for maintaining information associated with access credentials of the devices in the social mesh network. In certain other configurations, the apparatus 1002/1002' for wireless communication may include means for to accessing social mesh network profiles associated with each device in a social mesh network.

In certain other configurations, the apparatus 1002/1002' for wireless communication may include means for receiving, from the first device, a packet intended for the second device.

In certain other configurations, the apparatus 1002/1002' for wireless communication may include means for determining if the second device is connected to the social mesh network. In certain other configurations, the apparatus 1002/1002' for wireless communication may include means for accessing the social mesh profile associated with the second device to determine if the second device is connected to social mesh network.

In certain other configurations, the apparatus 1002/1002' for wireless communication may include means for maintaining the packet when it is determined that the second device is not connected to the social mesh network. In certain other configurations, the apparatus 1002/1002' for wireless communication may include means for determining the connection status of the second device at predetermined intervals.

In certain other configurations, the apparatus 1002/1002' for wireless communication may include means for communicating the packet to the second device when it is determined the second device is connected to the mesh network.

The aforementioned means may be one or more of the aforementioned processor(s) 202, WLAN controller 250, short-range communications controller 252, and/or radio 230 in FIG. 2, components of the apparatus 1002 and/or the processing system 1114 of the apparatus 1002' configured to perform the functions recited by the aforementioned means.

Figure 12:
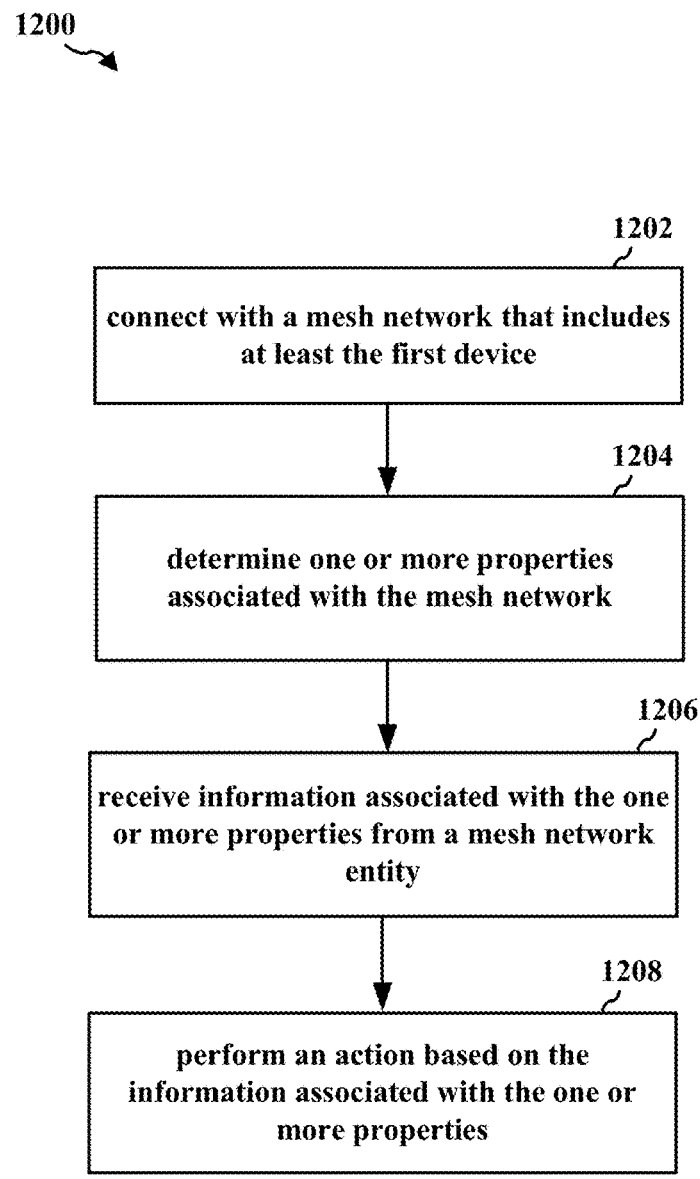
FIG. 12 is a flowchart of a method of wireless communication.

FIG. 12 is a flowchart 1200 of a method of wireless communication. The method may be performed by a first device (e.g., wireless mesh node 102, wireless mesh client device 104, wireless device 200, first device 402, 502, 1050, 1650, second device 404, 504, 1055, 1655, the apparatus 802/802', 1302/1302').

At 1202, the first device may connect with a mesh network that includes at least a second device. For example, referring to FIG. 5, the first device 502 may connect (at 507) with the social mesh network that includes the second device 504. For example, the connection (at 507) to the social mesh network may be an initial connection when the first device 502 first joins the social mesh network, or a subsequent connection after the initial connection.

At 1204, the first device may determine one or more properties associated with the mesh network. For example, referring to FIG. 5, the first device 502 may determine (at 509) one or more properties associated with the social mesh network. For example, the first device 502 may determine (at 509) that information published to the social mesh network is automatically displayed upon connecting to the social mesh network. The first device 502 may maintain information associated with the one or more properties associated with the wireless mesh. In certain other aspects, the first device 502 may receive signaling (e.g., from the MNE 506 or another device in the social mesh network) that indicates the properties associated with the wireless mesh network when the first device 502 connects to the wireless mesh network.

At 1206, the first device may receive published information from the mesh network. In one aspect, the published information may be sent to the mesh network by the second device. For example, referring to FIG. 5, the MNE 506 may receive (at 505) information published by the second device 504 to the social mesh network. For example, the information published by the second device 504 may include one or more of an image file, a video file, an audio file, navigation information, etc. In certain aspects, a user associated with the social mesh network may be able to access his or her social mesh network account from a second device 504 that is not registered with the social mesh network (e.g., a desktop computer). In such a scenario, the information published using a device that is not part of the social mesh network will be published by the MNE 506 to the devices in the social mesh network. The MNE 506 may transmit (at 515), to the first device 502, the information published by the second device 504 when it is determined (at 511) that the first device 502 is connected to the social mesh network.

At 1208, the first device may perform an action based on the information associated with the one or more properties. For example, referring to FIG. 5, the first device 502 may perform (at 517) an action based on the information published by the second device 504 and the one or more properties associated with the social mesh network. In one aspect, the one or more properties may indicate that the first device 502 is to display an image, video, or perform navigation that was published by the second device 504 to the social mesh network upon connecting to the social mesh network.

Figure 13:
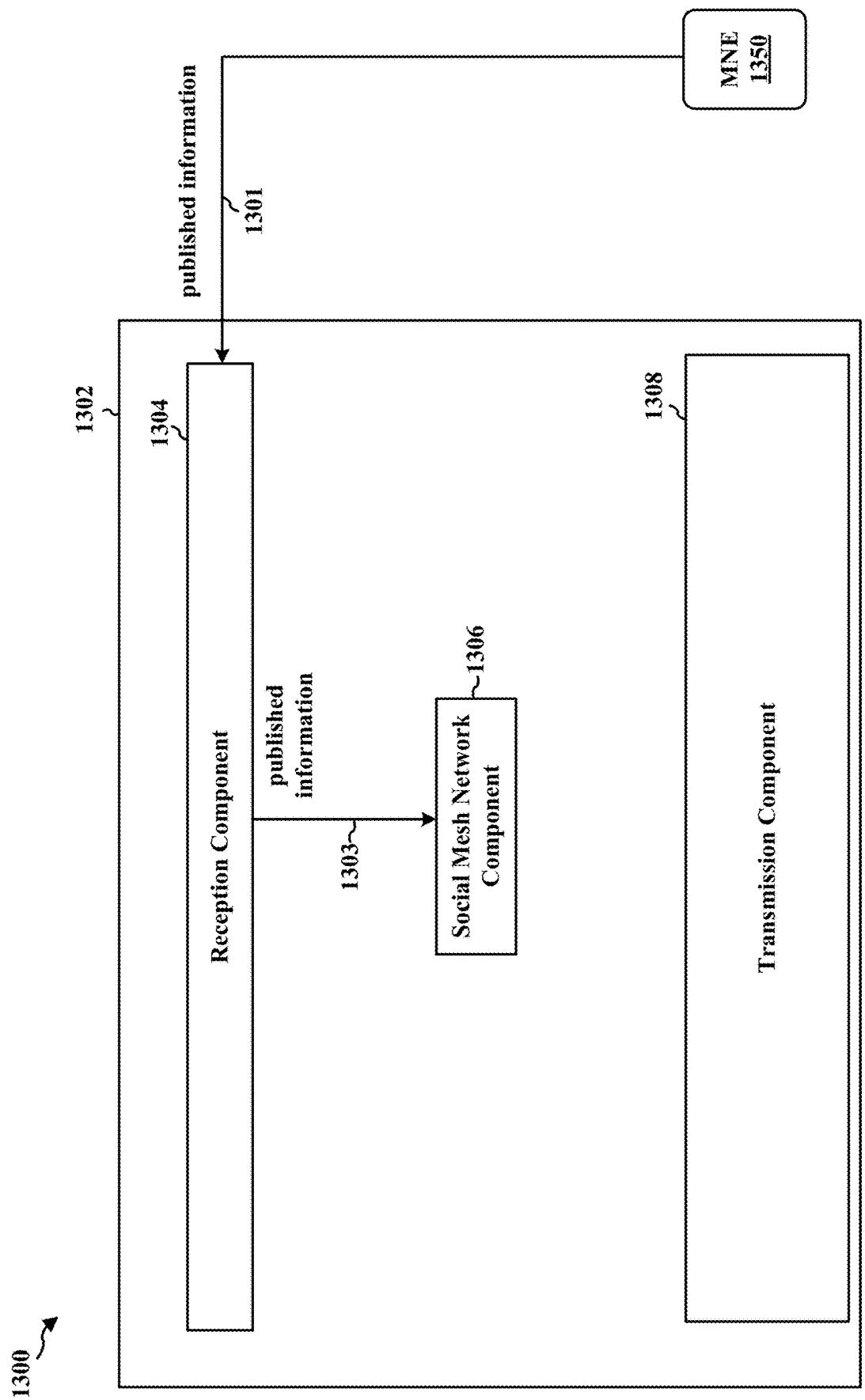
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a first device (e.g., wireless mesh node 102, wireless mesh client device 104, wireless device 200, first device 302, 402, 502, 1650, second device 304, 404, 504, 850, 1055, 1655, the apparatus 702/702', 1302/1302') in communication with a MNE 1350 (e.g., wireless mesh node 102, wireless mesh client device 104, wireless device 200, MNE 506, the apparatus 1002/1002', 1602/1602'). The apparatus may include a reception component 1304, a social mesh network component 1306, and a transmission component 1308.

In certain configurations, the social mesh network component 1306 may be configured to connect with a mesh network that includes at least one second device. In certain other configurations, the social mesh network component 1306 may be configured to determine one or more properties associated with the social mesh network. In certain aspects, the one or more properties may include at least one of playing an audio file, displaying an image, performing navigation, etc.

In certain configurations, the reception component 1304 may be configured to receive published information 1301 from the MNE 1350. In one aspect, the published information may be sent to the MNE 1350 by a second device (not shown). In certain other aspects, the second device may not be part of the mesh network. The reception component 1304 may be configured to send a signal 1303 associated with the published information to the social mesh network component 1306.

In certain configurations, the social mesh network component 1306 may be configured to perform an action based on the information associated with the one or more properties.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
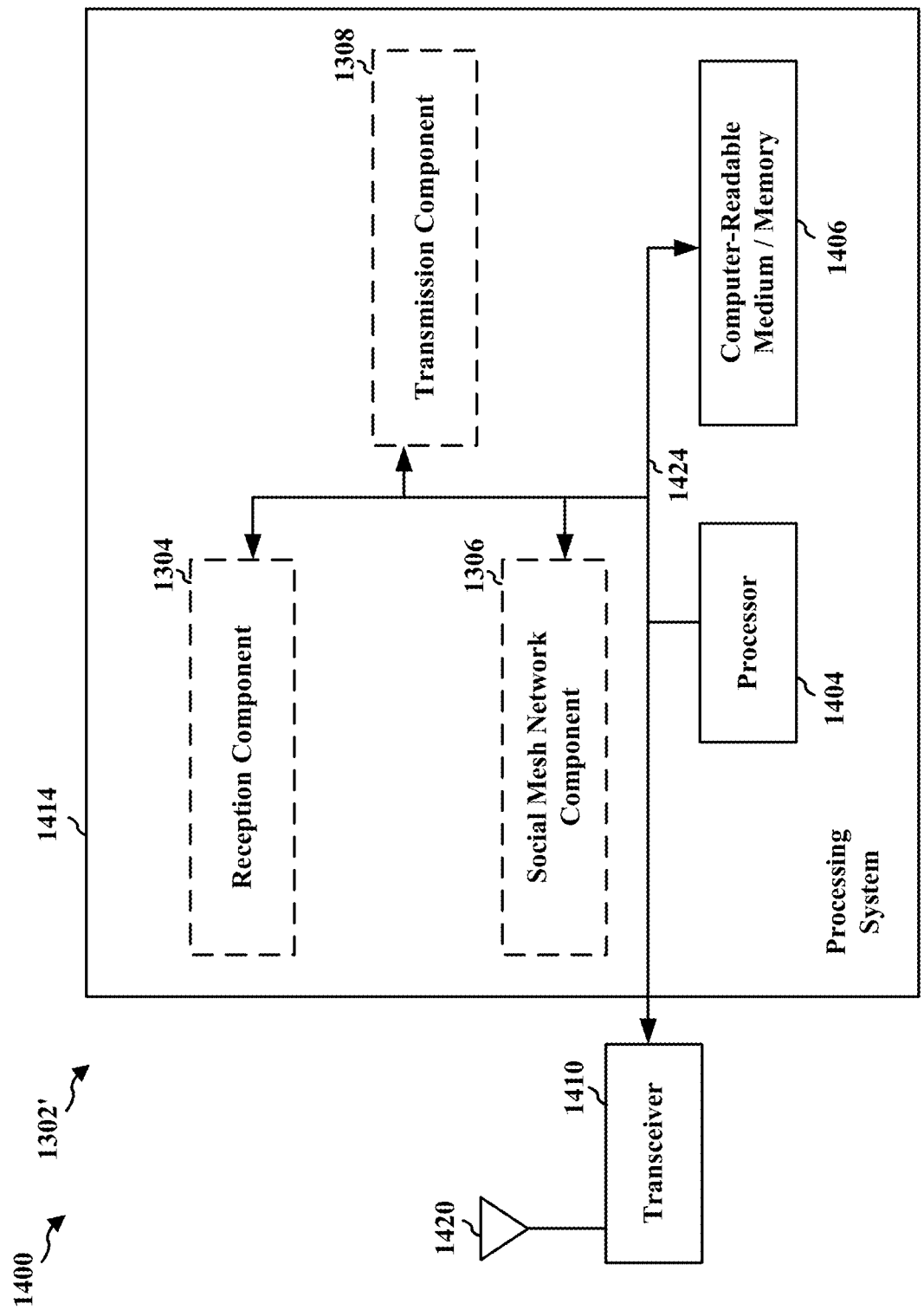
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1308, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308. The components may be software components running in the processor 1404, resident/stored in the computer readable medium/memory 1406, one or more hardware components coupled to the processor 1404, or some combination thereof.

In certain configurations, the apparatus 1302/1302' for wireless communication may include means for connecting with a mesh network that includes at least one second device. In certain other configurations, the apparatus 1302/1302' for wireless communication may include means for determining one or more properties associated with the social mesh network. In certain aspects, the one or more properties may include at least one of playing an audio file, displaying an image, performing navigation, etc.

In certain other configurations, the apparatus 1302/1302' for wireless communication may include means for receiving published information from the mesh network. In one aspect, the published information may originate from a second device. In certain other aspects, the second device may not be part of the mesh network.

In certain other configurations, the apparatus 1302/1302' for wireless communication may include means for performing an action based on the information associated with the one or more properties.

The aforementioned means may be one or more of the aforementioned processor(s) 202, WLAN controller 250, short-range communications controller 252, and/or radio 230 in FIG. 2, components of the apparatus 1302 and/or the processing system 1414 of the apparatus 1302' configured to perform the functions recited by the aforementioned means.

Figure 15:
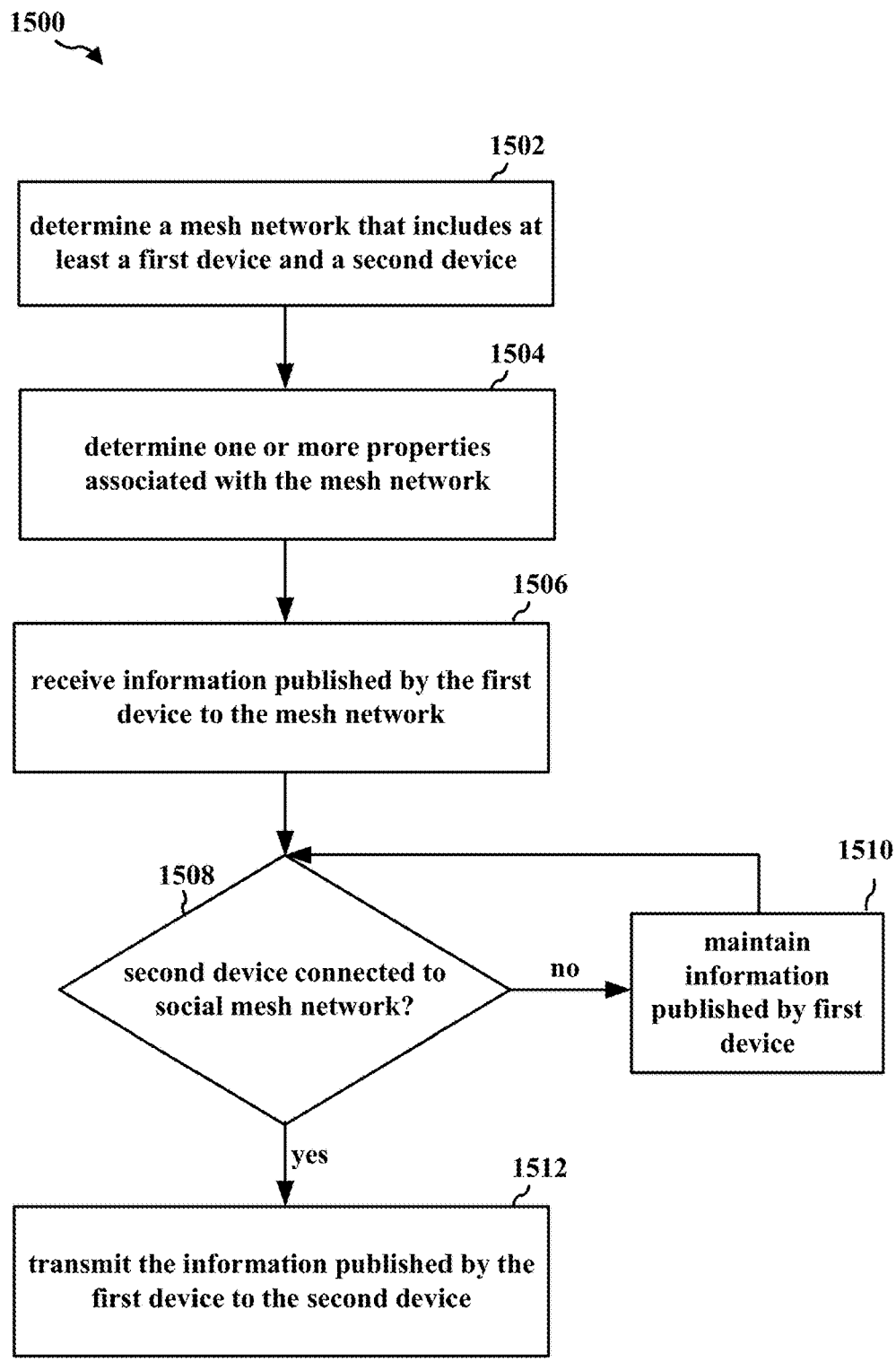
FIG. 15 is a flowchart of a method of wireless communication.

FIG. 15 is a flowchart 1500 of a method of wireless communication. The method may be performed by a MNE (e.g., wireless mesh node 102, wireless mesh client device 104, wireless device 200, MNE 506, 1350, the apparatus 1002/1002', 1602/1602').

At 1502, the MNE may be configured to determine a mesh network that includes at least a first device and a second device. For example, referring to FIG. 5, the MNE 506 may determine (at 501) a mesh network that includes at least the first device 502 and the second device 504. For example, the MNE 506 may determine which devices are part of the social mesh network, and maintain information that correlates access credentials to respective devices in the social mesh network. When devices are added and/or removed from the social mesh network, the MNE 506 may be responsible for communicating updated information indicating the addition or removal of a device to all of the other devices in the social mesh network. In addition, the MNE 506 may have access to social mesh network profiles associated with each device in the social mesh network that indicates if a device is currently available for communications within the social mesh network.

At 1504, the MNE may be configured to determine one or more properties associated with the mesh network. For example, referring to FIG. 5, the MNE 506 may determine (at 503) one or more properties associated with the social mesh network. In certain aspects, the MNE 506 may maintain information related to properties of a social mesh network. The properties associated with the social mesh network may be set by a user of one of the devices within the social mesh network.

At 1506, the MNE may be configured to receive information published by the first device to the mesh network. For example, referring to FIG. 5, the MNE 506 may receive (at 505) information published by the second device 504 (e.g., the first device in operation 1506) to the social mesh network. For example, the information published by the second device 504 may include one or more of an image file, a video file, an audio file, navigation information, etc. In certain aspects, a user associated with the social mesh network may be able to access his or her social mesh network account from a second device 504 that is not registered with the social mesh network (e.g., a desktop computer). In such a scenario, the information published using a device that is not part of the social mesh network will be published by the MNE 506 to the devices in the social mesh network.

At 1508, the MNE may determine if the second device is connected to the mesh network. For example, referring to FIG. 5, the MNE 506 may determine (at 511) if the first device 502 (e.g., the second device in operation 1508) is connected to the social mesh network. For example, the MNE 506 may access a social mesh network profile associated with the first device 502 to determine if the first device 502 is connected to the social network, and able to receive published information. When it is determined (at 511) that the first device 502 is not connected to the social mesh network, the MNE 506 may be configured to determine the connection status of the first device 502 at predetermined intervals (e.g., 5 ms, 1 second, 1 minute, 5 minutes, 10 minutes, etc.).

When it is determined (at 1508) that the second device is not connected to the social mesh network, the operation may move to 1510. Otherwise, when it is determined (at 1508) that the second device is connected to the social mesh network, the operation may move to 1512.

At 1510, the MNE may maintain the information published by the first device when it is determined that the second device is not connected to the mesh network. The MNE may maintain (at 513) the published information until the first device 502 connects to the social mesh network.

At 1512, the MNE may transmit the information to the second device when the second device is connected to the mesh network. For example, referring to FIG. 5, the MNE 506 may transmit (at 515), to the first device 502, the information published by the second device 504 when it is determined (at 511) that the first device 502 is connected to the social mesh network.

Figure 16:
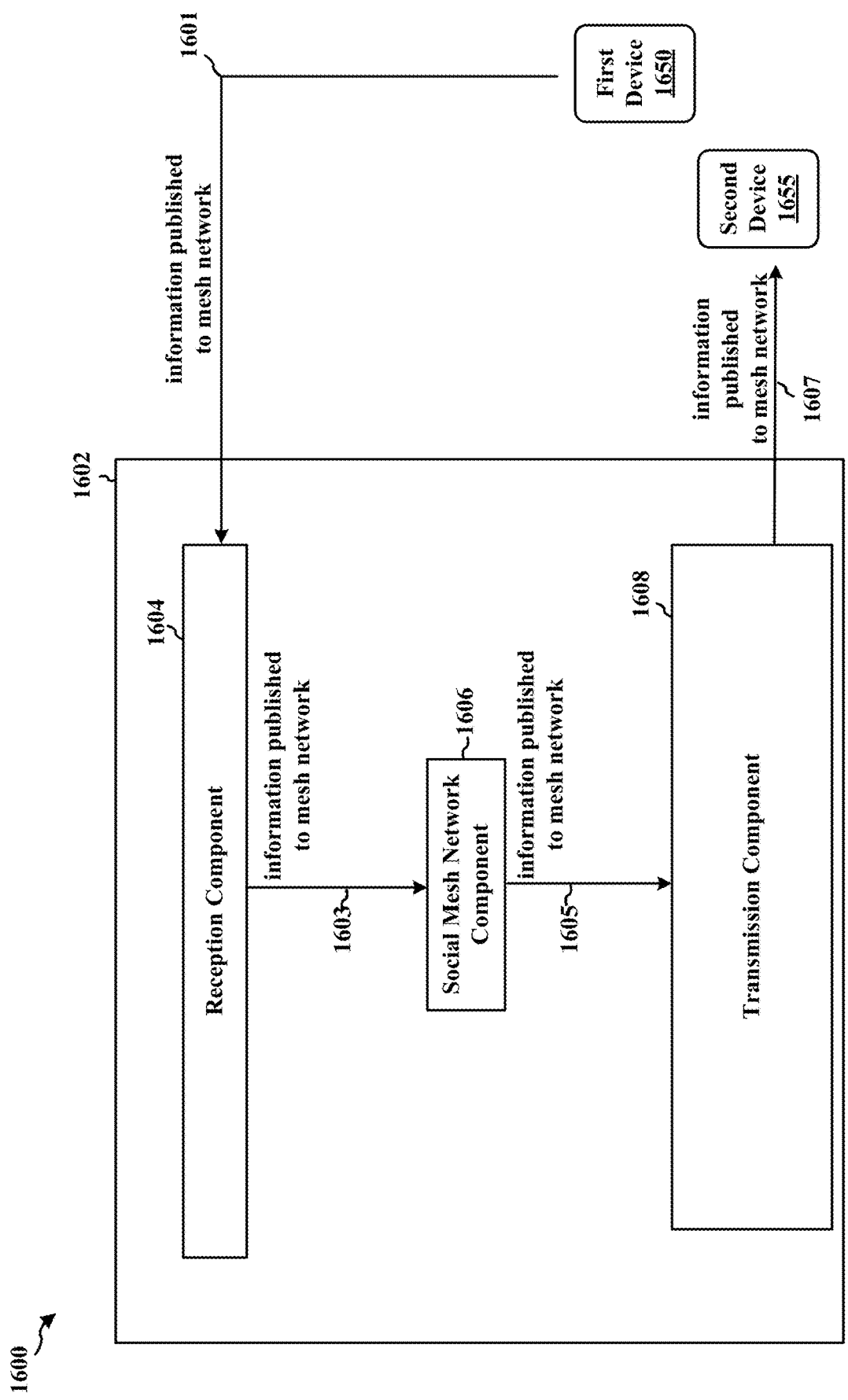
FIG. 16 is a conceptual data flow diagram illustrating the data flow between different means/components in an exemplary apparatus.

FIG. 16 is a conceptual data flow diagram 1600 illustrating the data flow between different means/components in an exemplary apparatus 1602. The apparatus may be a MNE (e.g., wireless mesh node 102, wireless mesh client device 104, wireless device 200, MNE 506, 1350, the apparatus 1002/1002', 1602') in communication with a first device 1650 (e.g., wireless mesh node 102, wireless mesh client device 104, wireless device 200, first device 302, 402, 502, second device 304, 404, 504, 850, 1055, the apparatus 702/702', 1302/1302') in communication with a second device 1655 (e.g., wireless mesh node 102, wireless mesh client device 104, wireless device 200, first device 302, 402, 502, 1050, second device 304, 404, 504, 1055, the apparatus 1302/1302'). The apparatus may include a reception component 1604, a social mesh network component 1606, and a transmission component 1608.

In certain configurations, the social mesh network component 1606 may be configured to determine a mesh network that includes at least the first device 1650 and the second device 1655. In certain other configurations, the social mesh network component 1606 may be configured to determine one or more properties associated with the mesh network.

In certain other configurations, the reception component 1604 may be configured to receive information published 1601 by the first device 1650 to the mesh network. The reception component 1604 may be configured to send a signal 1603 associated with the published information to the social mesh network component 1606.

In certain other configurations, the social mesh network component 1606 may be configured to determine if the second device 1655 is connected to the mesh network. In certain other configurations, the social mesh network component 1606 may be configured to maintain the information published by the first device when it is determined that the second device is not connected to the mesh network. When the social mesh network component 1606 determines that the second device 1655 is connected to the social mesh network, the social mesh network component 1606 may be configure to send a signal 1605 associated with the published information to the transmission component 1608. The transmission component 1608 may be configured to transmit the published information 1607 to the second device 1655.

The apparatus may include additional components that perform each of the blocks of the algorithm in the aforementioned flowchart of FIG. 15. As such, each block in the aforementioned flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
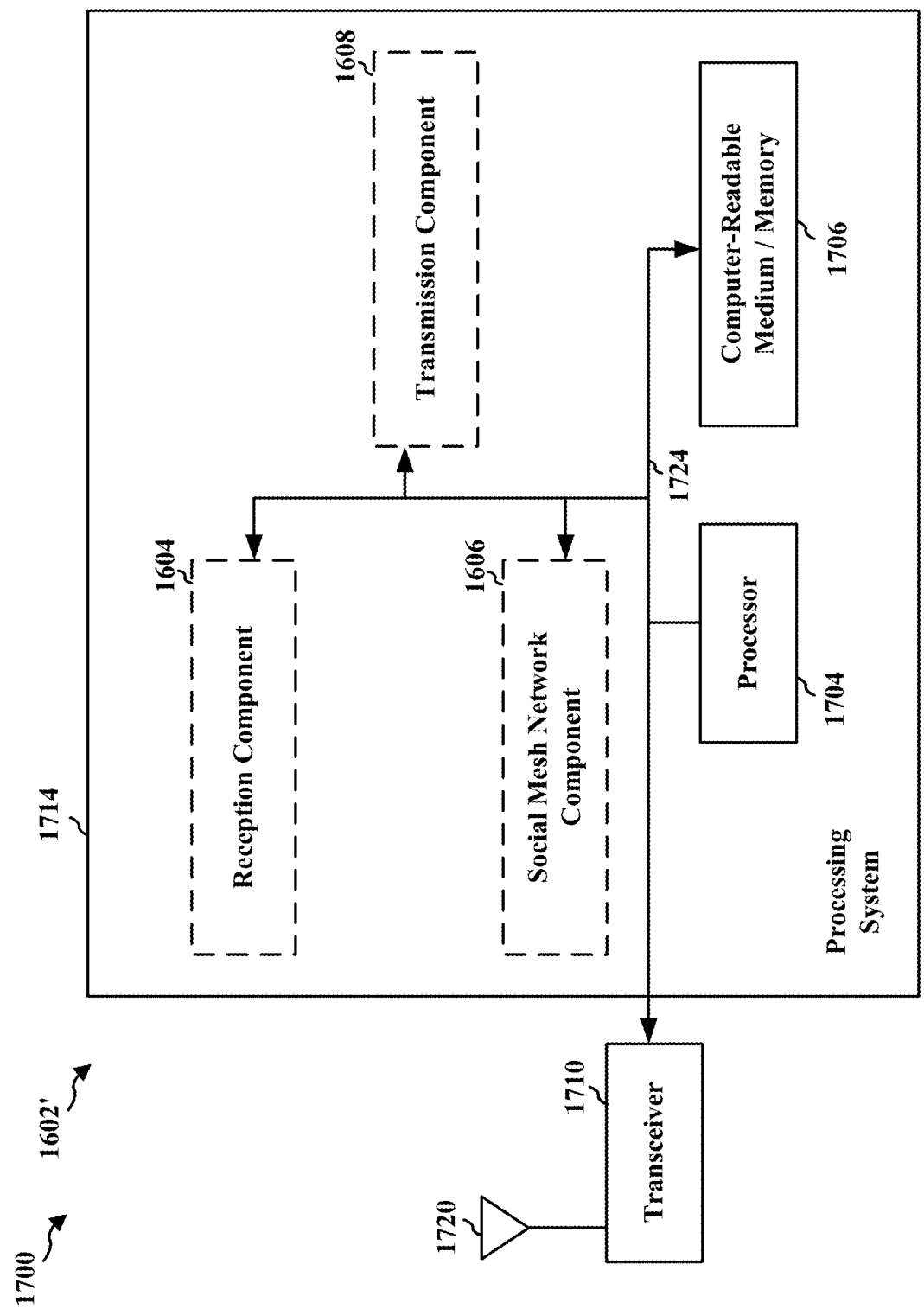
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1608, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608. The components may be software components running in the processor 1704, resident/stored in the computer readable medium/memory 1706, one or more hardware components coupled to the processor 1704, or some combination thereof.

In certain configurations, the apparatus 1602/1602' for wireless communication includes means for determining a mesh network that includes at least a first device and a second device. In certain other configurations, the apparatus 1602/1602' for wireless communication includes means for determining one or more properties associated with the mesh network.

In certain other configurations, the apparatus 1602/1602' for wireless communication includes means for receiving information published by the first device to the mesh network.

In certain other configurations, the apparatus 1602/1602' for wireless communication includes means for determining if the second device is connected to the mesh network. In certain other configurations, the apparatus 1602/1602' for wireless communication includes means for maintaining the information published by the first device when it is determined that the second device is not connected to the mesh network. In certain other configurations, the apparatus 1602/1602' for wireless communication includes means for transmit the published information to the second device.

The aforementioned means may be one or more of the aforementioned processor(s) 202, WLAN controller 250, short-range communications controller 252, and/or radio 230 in FIG. 2, components of the apparatus 1602 and/or the processing system 1714 of the apparatus 1602' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a first device, comprising:
    connecting to a mesh network associated with a mesh topology, the mesh network including at least the first device and a second device, wherein the second device is accessed using one or more access credentials;
    receiving, from a mesh network entity, the one or more access credentials for the second device, wherein the one or more access credentials is maintained at the first device; and
    communicating with the second device without obtaining the one or more access credentials from the second device when a mesh network beacon associated with the mesh network is received that causes the first devise to use the one or more access credentials maintained at the first device for accessing the second device.

2. The method of claim 1, wherein the one or more access credentials include at least one of wireless local area network (WLAN) credentials or short-range communication credentials.

3. The method of claim 1, further comprising:
    receiving the mesh network beacon associated with the mesh network from the second device, wherein the mesh network beacon indicates that the second device is part of the mesh network and is available for a connection.

4. A method of wireless communication of a mesh network entity, comprising:
    identifying a mesh network associated with a mesh topology, the mesh network including at least a first device and a second device, wherein the second device is accessed based on a mesh network beacon that causes the one or more access credentials maintained at the first device to be used for accessing the second device;
    receiving, from the first device, a packet intended for the second device;
    determining whether the second device is connected to the mesh network;
    maintaining the packet in a buffer when the mesh network entity determines that the second device is not connected to the mesh network; and
    communicating the packet to the second device when the mesh network entity determines that the second device is connected to the mesh network without obtaining the one or more access credentials from the second device.

5. A method of wireless communication of a first device, comprising:
    connecting with a mesh network associated with a mesh topology, the mesh network including a second device, wherein the second device is accessed based on a mesh network beacon that causes the one or more access credentials maintained at the first device to be used for accessing the second device;
    determining one or more properties associated with the mesh network;
    receiving published information from the mesh network, the published information originating from the second device; and
    performing an action based on the published information associated with the one or more properties.

6. The method of claim 5, wherein the one or more properties includes at least one of playing an audio file, displaying an image, or performing navigation.

7. A method of wireless communication of a mesh network entity, comprising:
    identifying a mesh network associated with a mesh topology, the mesh network including at least a first device and a second device, wherein the first device is accessed based on a mesh network beacon that causes the one or more access credentials maintained at the second device to be used for accessing the first device;
    determining one or more properties associated with the mesh network;
    receiving information published by the first device to the mesh network;
    determining whether the second device is connected to the mesh network;
    maintaining the information published by the first device when the mesh network entity determines that the second device is not connected to the mesh network; and
    transmitting the information to the second device when the second device is connected to the mesh network without obtaining the one or more access credentials from the first device.

8. An apparatus for wireless communication of a first device, comprising:
    means for connecting to a mesh network associated with a mesh topology, the mesh network including at least the first device and a second device, wherein the second device is accessed using one or more access credentials;
    means for receiving, from a mesh network entity, the one or more access credentials for the second device, wherein the one or more access credentials is maintained at the first device; and
    means for communicating with the second device without obtaining the one or more access credentials from the second device when a mesh network beacon associated with the mesh network is received that causes the first device to use the one or more access credentials maintained at the first device for accessing the second device.

9. The apparatus of claim 8, wherein the one or more access credentials include at least one of wireless local area network (WLAN) credentials or short-range communication credentials.

10. The apparatus of claim 8, further comprising:
means for receiving the mesh network beacon associated with the mesh network from the second device, wherein the mesh network beacon indicates that the second device is part of the mesh network and is available for a connection.

11. An apparatus for wireless communication of a mesh network entity, comprising:
means for identifying a mesh network associated with a mesh topology, the mesh network including at least a first device and a second device, wherein the second device is accessed based on a mesh network beacon that causes the one or more access credentials maintained at the first device to be used for accessing the second device;
means for receiving, from the first device, a packet intended for the second device;
means for determining whether the second device is connected to the mesh network;
means for maintaining the packet in a buffer when the mesh network entity determines that the second device is not connected to the mesh network; and
means for communicating the packet to the second device when the mesh network entity determines that the second device is connected to the mesh network without obtaining the one or more access credentials from the second device.

12. An apparatus for of wireless communication of a first device, comprising:
means for connecting with a mesh network associated with a mesh topology, the mesh network including a second device, wherein the second device is accessed based on a mesh network beacon that causes the one or more access credentials maintained at the first device to be used for accessing the second device;
means for determining one or more properties associated with the mesh network;
means for receiving published information from the mesh network, the published information originating from the second device; and
means for performing an action based on the published information associated with the one or more properties.

13. The apparatus of claim 12, wherein the one or more properties includes at least one of playing an audio file, displaying an image, or performing navigation.

14. An apparatus for wireless communication of a mesh network entity, comprising:
means for identifying a mesh network associated with a mesh topology, the mesh network including at least a first device and a second device, wherein the first device is accessed based on a mesh network beacon that causes the one or more access credentials maintained at the second device to be used for accessing the first device;
means for determining one or more properties associated with the mesh network;
means for receiving information published by the first device to the mesh network;
means for determining whether the second device is connected to the mesh network;

means for maintaining the information published by the first device when the mesh network entity determines that the second device is not connected to the mesh network; and
means for transmitting the information to the second device when the second device is connected to the mesh network without obtaining the one or more access credentials from the first device.

15. An apparatus for wireless communication of a first device, comprising:
a memory; and
at least one processor coupled to the memory and configured to:
connect to a mesh network associated with a mesh topology, the mesh network including at least the first device and a second device, wherein the second device is accessed using one or more access credentials;
receive, from a mesh network entity, the one or more access credentials for the second device, wherein the one or more access credentials is maintained at the first device; and
communicate with the second device without obtaining the one or more access credentials from the second device when a mesh network beacon associated with the mesh network is received that causes the first device to use the one or more access credentials maintained at the first device for accessing the second device.

16. The apparatus of claim 15, wherein the one or more access credentials include at least one of wireless local area network (WLAN) credentials or short-range communication credentials.

17. The apparatus of claim 15, wherein the at least one processor is further configured to:
receive the mesh network beacon associated with the mesh network from the second device, wherein the mesh network beacon indicates that the second device is part of the mesh network and is available for a connection.

18. An apparatus for wireless communication of a mesh network entity, comprising:
a memory; and
at least one processor coupled to the memory and configured to:
identify a mesh network associated with a mesh topology, the mesh network including at least a first device and a second device, wherein the second device is accessed based on a mesh network beacon that causes the one or more access credentials maintained at the first device to be used for accessing the second device;
receive, from the first device, a packet intended for the second device;
determine whether the second device is connected to the mesh network;
maintain the packet in a buffer when the mesh network entity determines that the second device is not connected to the mesh network; and
communicate the packet to the second device when the mesh network entity determines that the second device is connected to the mesh network without obtaining the one or more access credentials from the second device.

19. An apparatus for wireless communication of a first device, comprising:
a memory; and at least one processor coupled to the memory and configured to:
- connect with a mesh network associated with a mesh topology, the mesh network including a second device, wherein the second device is accessed based on a mesh network beacon that causes the one or more access credentials maintained at the first device to be used for accessing the second device;
- determine one or more properties associated with the mesh network;
- receive published information from the mesh network, the published information originating from the second device; and
- perform an action based on the published information associated with the one or more properties.

20. The apparatus of claim 19, wherein the one or more properties includes at least one of playing an audio file, displaying an image or performing navigation.

21. An apparatus for wireless communication of a mesh network entity, comprising:
a memory; and
at least one processor coupled to the memory and configured to:
- identify a mesh network associated with a mesh topology, the mesh network including at least a first device and a second device, wherein the first device is accessed based on a mesh network beacon that causes the one or more access credentials maintained at the second device to be used for accessing the first device;
- determine one or more properties associated with the mesh network;
- receive information published by the first device to the mesh network;
- determine whether the second device is connected to the mesh network;
- maintain the information published by the first device when the mesh network entity determines that the second device is not connected to the mesh network; and
- transmit the information to the second device when the second device is connected to the mesh network without obtaining the one or more access credentials from the first device.

22. A non-transitory computer-readable medium storing computer executable code for a first device, the code when executed by a processor of the first device causes the first device to:
- connect to a mesh network associated with a mesh topology, the mesh network including at least the first device and a second device, wherein the second device is accessed using one or more access credentials;
- receive, from a mesh network entity, the one or more access credentials for the second device, wherein the one or more access credentials is maintained at the first device; and
- communicate with the second device without obtaining the one or more access credentials from the second device when a mesh network beacon associated with the mesh network is received that causes the first device to use the one or more access credentials maintained at the first device for accessing the second device.

23. The non-transitory computer-readable medium of claim 22, wherein the one or more access credentials include at least one of wireless local area network (WLAN) credentials or short-range communication credentials.

24. The non-transitory computer-readable medium of claim 22, wherein the processor further causes the first device to:
- receive the mesh network beacon associated with the mesh network from the second device, wherein the mesh network beacon indicates that the second device is part of the mesh network and is available for a connection.

25. A non-transitory computer-readable medium storing computer executable code for a mesh network entity, the code when executed by a processor of the mesh network entity causes the mesh network entity to:
- identify a mesh network associated with a mesh topology, the mesh network including at least a first device and a second device, wherein the second device is accessed based on a mesh network beacon that causes the one or more access credentials maintained at the first device to be used for accessing the second device;
- receive, from the first device, a packet intended for the second device;
- determine whether the second device is connected to the mesh network;
- maintain the packet in a buffer when the mesh network entity determines that the second device is not connected to the mesh network; and
- communicate the packet to the second device when the mesh network entity determines that the second device is connected to the mesh network without obtaining the one or more access credentials from the second device.

26. A non-transitory computer-readable medium storing computer executable code for a first device, the code when executed by a processor of the first device causes the first device to:
- connect with a mesh network associated with a mesh topology, the mesh network including a second device, wherein the second device is accessed based on a mesh network beacon that causes the one or more access credentials maintained at the first device to be used for accessing the second device;
- determine one or more properties associated with the mesh network;
- receive published information from the mesh network, the published information originating from the second device; and
- perform an action based on the published information associated with the one or more properties.

27. The non-transitory computer-readable medium of claim 26, wherein the one or more properties includes at least one of playing an audio file, displaying an image, or performing navigation.

28. A non-transitory computer-readable medium storing computer executable code for a mesh network entity, the code when executed by a processor of the mesh network entity causes the mesh network entity to:
- identify a mesh network associated with a mesh topology, the mesh network including at least a first device and a second device, wherein the first device is accessed based on a mesh network beacon that causes one or more access credentials maintained at the second device to be used for accessing the first device;
- determine one or more properties associated with the mesh network;
- receive information published by the first device to the mesh network;
- determine whether the second device is connected to the mesh network;

maintain the information published by the first device when the mesh network entity determines that the second device is not connected to the mesh network; and transmit the information to the second device when the second device is connected to the mesh network without obtaining the one or more access credentials from the first device.

* * * * *